(12) United States Patent
Kumar

(10) Patent No.: US 12,120,712 B2
(45) Date of Patent: Oct. 15, 2024

(54) LOW-FREQUENCY UPLINK SIGNAL BASED POSITIONING

(71) Applicant: QUALCOMM INCORPORATED, San Diego, CA (US)

(72) Inventor: Akash Kumar, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/507,952

(22) Filed: Nov. 13, 2023

(65) Prior Publication Data

US 2024/0080871 A1    Mar. 7, 2024

Related U.S. Application Data

(63) Continuation of application No. 17/217,534, filed on Mar. 30, 2021, now Pat. No. 11,877,300.

(51) Int. Cl.
| | |
|---|---|
| *H04W 72/51* | (2023.01) |
| *H04L 5/00* | (2006.01) |
| *H04W 72/044* | (2023.01) |
| *H04W 72/0453* | (2023.01) |
| *H04W 72/21* | (2023.01) |

(52) U.S. Cl.
CPC ........... *H04W 72/51* (2023.01); *H04L 5/0051* (2013.01); *H04W 72/0453* (2013.01); *H04W 72/0473* (2013.01); *H04W 72/21* (2023.01)

(58) Field of Classification Search
CPC ............. H04W 72/51; H04W 72/0453; H04W 72/0473; H04W 72/21; H04W 64/00; H04W 24/08; H04L 5/0051; H04L 5/0048; H04L 5/0069; H04L 5/0094; G01S 13/765; G01S 5/0236
See application file for complete search history.

(56) References Cited

U.S. PATENT DOCUMENTS

| | | | |
|---|---|---|---|
| 11,516,735 B2 | 11/2022 | Thangarasa et al. | |
| 11,528,626 B2 | 12/2022 | Kazmi et al. | |
| 11,877,300 B2 * | 1/2024 | Kumar | G01S 5/0236 |
| 2017/0366328 A1 | 12/2017 | Seo et al. | |

(Continued)

FOREIGN PATENT DOCUMENTS

EP    3681226 A1    7/2020

OTHER PUBLICATIONS

International Search Report and Written Opinion—PCT/US2022/014455—ISA/EPO—Jun. 1, 2022.

*Primary Examiner* — Brian T O Connor
(74) *Attorney, Agent, or Firm* — SUNSTEIN LLP

(57) ABSTRACT

A method of indicating resources for uplink-based positioning includes: determining whether a UE is within a downlink coverage area of a serving cell, for a first frequency band and a transmit power of the serving cell, and outside an uplink coverage area of the serving cell for the first frequency band and a transmit power of the UE; identifying a second frequency band supported by the UE, the second frequency band including frequencies below a lowest frequency of the first frequency band; and providing at least one PRS indication indicating at least OFDM UL-PRS resources in the second frequency band for the UE based on a determination that the UE is outside the uplink coverage area of the serving cell for the first frequency band and the transmit power of the UE.

47 Claims, 11 Drawing Sheets

(56) References Cited

U.S. PATENT DOCUMENTS

| | | |
|---|---|---|
| 2018/0317141 A1 | 11/2018 | Siomina et al. |
| 2020/0221500 A1 | 7/2020 | Zhang et al. |
| 2021/0410077 A1 | 12/2021 | Guo |
| 2022/0322330 A1 | 10/2022 | Kumar |
| 2023/0105175 A1 | 4/2023 | Kazmi et al. |

* cited by examiner

900

| SUL band combination | Band | UL band | | DL band | |
|---|---|---|---|---|---|
| | | f-low | f-high | f-low | f-high |
| n78-n80 | n78 | 3300 | 3800 | 3300 | 3800 |
| | n80 | 1710 | 1785 | N/A | N/A |
| n79-n81 | n79 | 4400 | 5000 | 4400 | 5000 |
| | n81 | 800 | 915 | 800 | 915 |

910 920 930 940 950 960

LOW-FREQUENCY UPLINK SIGNAL BASED POSITIONING

CROSS-REFERENCE TO RELATED APPLICATIONS

This application is a continuation of U.S. patent application Ser. No. 17/217,534, filed Mar. 30, 2021, entitled "LOW-FREQUENCY UPLINK SIGNAL BASED POSITIONING," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example location server includes: a transceiver; a memory; and a processor communicatively coupled to the transceiver and the memory and configured to: determine whether a UE (user equipment) is within a downlink coverage area of a serving cell, for a first frequency band and a transmit power of the serving cell, and outside an uplink coverage area of the serving cell for the first frequency band and a transmit power of the UE; identify a second frequency band supported by the UE, the second frequency band including frequencies below a lowest frequency of the first frequency band; and provide, via the transceiver, at least one PRS indication indicating at least OFDM UL-PRS resources (orthogonal frequency division multiplexed uplink positioning reference signal resources) in the second frequency band for the UE based on a determination that the UE is outside the uplink coverage area of the serving cell for the first frequency band and the transmit power of the UE.

Implementations of such a location server may include one or more of the following features. The processor is configured to provide the at least one PRS indication indicating the OFDM UL-PRS resources, in the second frequency band, and OFDM DL-RS resources (downlink reference signal resources) based on the determination that the UE is outside the uplink coverage area of the serving cell for the first frequency band and the transmit power of the UE, and based on a single-measurement round-trip time positioning technique being designated for determining position of the UE. The uplink coverage area is a first uplink coverage area, the transmit power of the UE is a first transmit power of the UE, and the processor is configured to provide the at least one PRS indication indicating both the OFDM UL-PRS resources in the second frequency band and the OFDM DL-RS resources in the first frequency band based on the UE being in a second uplink coverage area of a companion cell for the UE, for the second frequency band and a second transmit power of the UE, and the serving cell being in sync with the companion cell. The processor is configured to provide the at least one PRS indication indicating the OFDM UL-PRS resources in the second frequency band and the OFDM DL-RS resources in the second frequency band. The uplink coverage area is a first uplink coverage area, and the processor is configured to provide the at least one PRS indication indicating both the OFDM UL-PRS resources and the OFDM DL-RS resources in the second frequency band based on the UE being in a second uplink coverage area of a companion cell for the UE, for the second frequency band and a second transmit power of the UE, and the serving cell being out of sync with the companion cell. The OFDM DL-RS resources correspond to one of a downlink PRS or an SSB (Synchronization Signal Block) signal.

Also or alternatively, implementations of such a location server may include one or more of the following features. The uplink coverage area is a first uplink coverage area, the transmit power of the UE is a first transmit power of the UE, the OFDM UL-PRS resources are first OFDM UL-PRS resources, and the processor is configured to provide the at least one PRS indication indicating, based on the UE being in the first uplink coverage area or in a marginal coverage-limited area of the serving cell, based on the UE being in a second uplink coverage area of a companion cell for the UE, for the second frequency band and a second transmit power of the UE, and based on a multi-measurement round-trip time positioning technique being designated for determining position of the UE: (1) the first OFDM UL-PRS resources in the first frequency band, and first OFDM DL-RS resources (downlink reference signal resources) in the first frequency band; and (2) second OFDM UL-PRS resources in the second frequency band, and second OFDM DL-RS resources in the second frequency band. The processor is configured to determine that the UE is outside the uplink coverage area of the serving cell based on a path loss between the serving cell and the UE exceeding the transmit power of the UE.

Another example location server includes: means for determining whether a UE is within a downlink coverage area of a serving cell, for a first frequency band and a transmit power of the serving cell, and outside an uplink coverage area of the serving cell for the first frequency band and a transmit power of the UE; means for identifying a second frequency band supported by the UE, the second frequency band including frequencies below a lowest frequency of the first frequency band; and means for providing at least one PRS indication indicating at least OFDM UL-PRS resources in the second frequency band for the UE based on a determination that the UE is outside the uplink coverage area of the serving cell for the first frequency band and the transmit power of the UE.

Implementations of such a location server may include one or more of the following features. The means for providing the at least one PRS indication include means for providing the at least one PRS indication indicating the OFDM UL-PRS resources, in the second frequency band, and OFDM DL-RS resources based on the determination that the UE is outside the uplink coverage area of the serving cell for the first frequency band and the transmit power of the UE, and based on a single-measurement round-trip time positioning technique being designated for determining position of the UE. The uplink coverage area is a first uplink coverage area, the transmit power of the UE is a first transmit power of the UE, and the means for providing the at least one PRS indication include means for providing the at least one PRS indication indicating both the OFDM UL-PRS resources in the second frequency band and the OFDM DL-RS resources in the first frequency band based on the UE being in a second uplink coverage area of a companion cell for the UE, for the second frequency band and a second transmit power of the UE, and the serving cell being in sync with the companion cell. The means for providing the at least one PRS indication include means for providing the at least one PRS indication indicating the OFDM UL-PRS resources in the second frequency band and the OFDM DL-RS resources in the second frequency band. The uplink coverage area is a first uplink coverage area, and the means for providing the at least one PRS indication include means for providing the at least one PRS indication indicating both the OFDM UL-PRS resources and the OFDM DL-RS resources in the second frequency band based on the UE being in a second uplink coverage area of a companion cell for the UE, for the second frequency band and a second transmit power of the UE, and the serving cell being out of sync with the companion cell. The OFDM DL-RS resources correspond to one of a downlink PRS or an SSB signal.

Also or alternatively, implementations of such a location server may include one or more of the following features. The uplink coverage area is a first uplink coverage area, the transmit power of the UE is a first transmit power of the UE, the OFDM UL-PRS resources are first OFDM UL-PRS resources, and the means for providing the at least one PRS indication include means for providing the at least one PRS indication indicating based on the UE being in the first uplink coverage area or in a marginal coverage-limited area of the serving cell, based on the UE being in a second uplink coverage area of a companion cell for the UE, for the second frequency band and a second transmit power of the UE, and based on a multi-measurement round-trip time positioning technique being designated for determining position of the UE: (1) the first OFDM UL-PRS resources in the first frequency band, and first OFDM DL-RS resources in the first frequency band; and (2) second OFDM UL-PRS resources in the second frequency band, and second OFDM DL-RS resources in the second frequency band. The means for determining whether the UE is within the downlink coverage area of the serving cell and outside the uplink coverage area of the serving cell include means for determining that the UE is outside the uplink coverage area of the serving cell based on a path loss between the serving cell and the UE exceeding the transmit power of the UE.

An example method of indicating resources for uplink-based positioning includes: determining whether a UE is within a downlink coverage area of a serving cell, for a first frequency band and a transmit power of the serving cell, and outside an uplink coverage area of the serving cell for the first frequency band and a transmit power of the UE; identifying a second frequency band supported by the UE, the second frequency band including frequencies below a lowest frequency of the first frequency band; and providing at least one PRS indication indicating at least OFDM UL-PRS resources in the second frequency band for the UE based on a determination that the UE is outside the uplink coverage area of the serving cell for the first frequency band and the transmit power of the UE.

Implementations of such a method may include one or more of the following features. Providing the at least one PRS indication includes providing the at least one PRS indication indicating the OFDM UL-PRS resources, in the second frequency band, and OFDM DL-RS resources based on the determination that the UE is outside the uplink coverage area of the serving cell for the first frequency band and the transmit power of the UE, and based on a single-measurement round-trip time positioning technique being designated for determining position of the UE. The uplink coverage area is a first uplink coverage area, the transmit power of the UE is a first transmit power of the UE, and providing the at least one PRS indication includes providing the at least one PRS indication indicating both the OFDM UL-PRS resources in the second frequency band and the OFDM DL-RS resources in the first frequency band based on the UE being in a second uplink coverage area of a companion cell for the UE, for the second frequency band and a second transmit power of the UE, and the serving cell being in sync with the companion cell. Providing the at least one PRS indication includes providing the at least one PRS indication indicating the OFDM UL-PRS resources in the second frequency band and the OFDM DL-RS resources in the second frequency band. The uplink coverage area is a first uplink coverage area, and providing the at least one PRS indication includes providing the at least one PRS indication indicating both the OFDM UL-PRS resources and the OFDM DL-RS resources in the second frequency band based on the UE being in a second uplink coverage area of a companion cell for the UE, for the second frequency band and a second transmit power of the UE, and the serving cell being out of sync with the companion cell. The OFDM DL-RS resources correspond to one of a downlink PRS or an SSB signal.

Also or alternatively, implementations of such a method may include one or more of the following features. The uplink coverage area is a first uplink coverage area, the transmit power of the UE is a first transmit power of the UE, the OFDM UL-PRS resources are first OFDM UL-PRS resources, and providing the at least one PRS indication includes providing the at least one PRS indication indicating, based on the UE being in the first uplink coverage area or in a marginal coverage-limited area of the serving cell, based on the UE being in a second uplink coverage area of a companion cell for the UE, for the second frequency band and a second transmit power of the UE, and based on a multi-measurement round-trip time positioning technique being designated for determining position of the UE: (1) the first OFDM UL-PRS resources in the first frequency band, and first OFDM DL-RS resources in the first frequency band; and (2) second OFDM UL-PRS resources in the second frequency band, and second OFDM DL-RS resources in the second frequency band. Determining whether the UE is within the downlink coverage area of the serving cell and outside the uplink coverage area of the serving cell includes determining that the UE is outside the uplink coverage area of the serving cell based on a path loss between the serving cell and the UE exceeding the transmit power of the UE.

An example non-transitory, processor-readable storage medium includes processor-readable instructions to cause a processor of a location server, to indicate resources for uplink-based positioning, to: determine whether a UE is within a downlink coverage area of a serving cell, for a first frequency band and a transmit power of the serving cell, and outside an uplink coverage area of the serving cell for the first frequency band and a transmit power of the UE; identify a second frequency band supported by the UE, the second frequency band including frequencies below a lowest frequency of the first frequency band; and provide at least one PRS indication indicating at least OFDM UL-PRS in the second frequency band for the UE based on a determination that the UE is outside the uplink coverage area of the serving cell for the first frequency band and the transmit power of the UE.

Implementations of such a storage medium may include one or more of the following features. The processor-readable instructions to cause the processor to provide the at least one PRS indication include processor-readable instructions to cause the processor to provide the at least one PRS indication indicating the OFDM UL-PRS resources, in the second frequency band, and OFDM DL-RS resources based on the determination that the UE is outside the uplink coverage area of the serving cell for the first frequency band and the transmit power of the UE, and based on a single-measurement round-trip time positioning technique being designated for determining position of the UE. The uplink coverage area is a first uplink coverage area, the transmit power of the UE is a first transmit power of the UE, and the processor-readable instructions to cause the processor to provide the at least one PRS indication include processor-readable instructions to cause the processor to provide the at least one PRS indication indicating both the OFDM UL-PRS resources in the second frequency band and the OFDM DL-RS resources in the first frequency band based on the UE being in a second uplink coverage area of a companion cell for the UE, for the second frequency band and a second transmit power of the UE, and the serving cell being in sync with the companion cell. The processor-readable instructions to cause the processor to provide the at least one PRS indication include processor-readable instructions to cause the processor to provide the at least one PRS indication indicating the OFDM UL-PRS resources in the second frequency band and the OFDM DL-RS resources in the second frequency band. The uplink coverage area is a first uplink coverage area, and the processor-readable instructions to cause the processor to provide the at least one PRS indication include processor-readable instructions to cause the processor to provide the at least one PRS indication indicating both the OFDM UL-PRS resources and the OFDM DL-RS resources in the second frequency band based on the UE being in a second uplink coverage area of a companion cell for the UE, for the second frequency band and a second transmit power of the UE, and the serving cell being out of sync with the companion cell. The OFDM DL-RS resources correspond to one of a downlink PRS or an SSB signal.

Also or alternatively, implementations of such a storage medium may include one or more of the following features. The uplink coverage area is a first uplink coverage area, the transmit power of the UE is a first transmit power of the UE, the OFDM UL-PRS resources are first OFDM UL-PRS resources, and the processor-readable instructions to cause the processor to provide the at least one PRS indication include processor-readable instructions to cause the processor to provide the at least one PRS indication indicating, based on the UE being in the first uplink coverage area or in a marginal coverage-limited area of the serving cell, based on the UE being in a second uplink coverage area of a companion cell for the UE, for the second frequency band and a second transmit power of the UE, and based on a multi-measurement round-trip time positioning technique being designated for determining position of the UE: (1) the first OFDM UL-PRS resources in the first frequency band, and first OFDM DL-RS resources in the first frequency band; and (2) second OFDM UL-PRS resources in the second frequency band, and second OFDM DL-RS resources in the second frequency band. The processor-readable instructions to cause the processor to determine whether the UE is within the downlink coverage area of the serving cell and outside the uplink coverage area of the serving cell include processor-readable instructions to cause the processor to determine that the UE is outside the uplink coverage area of the serving cell based on a path loss between the serving cell and the UE exceeding the transmit power of the UE.

DETAILED DESCRIPTION

Figure 1:
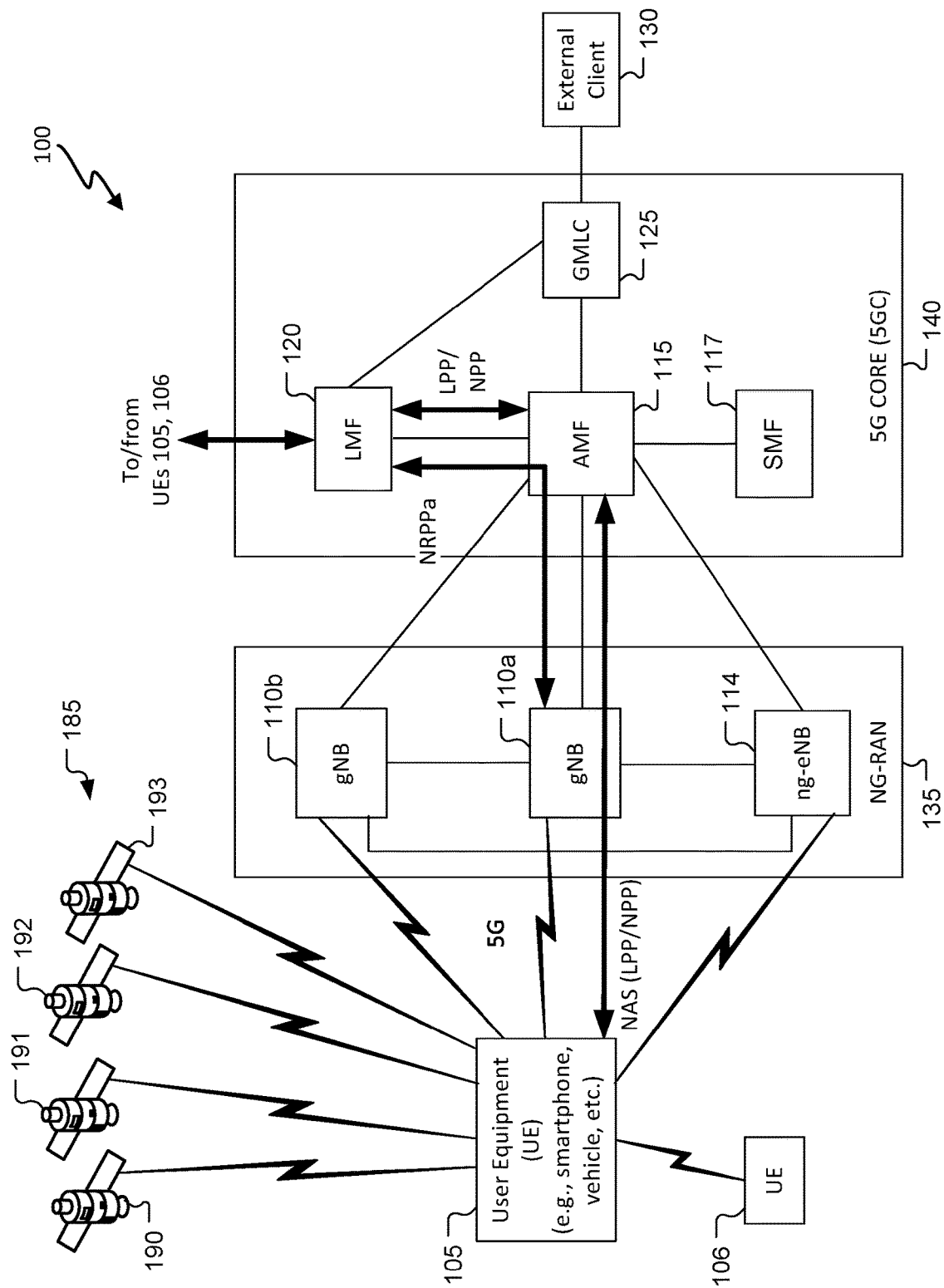
FIG. 1 is a simplified diagram of an example wireless communications system.

Techniques are discussed herein for performing uplink-based positioning techniques. For example, a supplemental uplink (SUL) band may be used for transmitting uplink (UL) positioning reference signals (PRS) from a mobile device. The UL-PRS and one or more downlink positioning signals may be sent over the SUL band to and from a companion cell for single-cell round-trip time (RTT) positioning where a serving cell (for a communication band) and the companion cell (for the SUL band) are not synced. Single-cell RTT may be referred to as single-measurement RTT because a single RTT measurement may be obtained from downlink and uplink reference signal transmissions using one cell or downlink reference signal transmission in one cell and uplink reference signal transmission in another cell (as opposed to multi-RTT where multiple RTT measurements are obtained using multiple cells). For example, the UL-PRS may be sent over the SUL band to the companion cell from a UE (user equipment) and the downlink positioning signal(s) may be sent using the communication band from the serving cell to the UE for single-cell RTT positioning where the serving cell and the companion cell are synced. For multi-cell RTT, the SUL band may be used to transmit UL-PRS and receive one or more downlink positioning signals to and from the companion cell (different than the serving cell) to obtain one measurement, and a primary (communication) band may be used for transmitting UL-PRS and receiving downlink positioning signal(s) to and from the serving cell to obtain another measurement. These are examples, and other examples (of UEs and/or criteria) may be implemented.

Items and/or techniques described herein may provide one or more of the following capabilities, as well as other capabilities not mentioned. Mobile device position may be determined using uplink-signal-based techniques in circumstances where uplink data signals are power limited. For example, uplink-based positioning techniques (e.g., RTT) in New Radio Ultra High Band in mid-cell and far-cell conditions may be enabled. Mobile device position determination accuracy may be increased, e.g., enabling uplink-signal-based techniques and/or enabling multi-cell techniques under circumstances previously not enabling such techniques. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" corresponds to one of a plurality of cells of a base station. The term "cell" refers to a logical communication entity used for communication (for example, over a carrier), and may be associated with an identifier for distinguishing neighboring cells (for example, a physical cell identifier (PCID), a virtual cell identifier (VCID)) operating via the same or a different carrier. A "cell" is thus a radiating entity (or combination of entities) that has a unique PCID for any given location such that at any given location, only one cell will be visible with a particular PCID. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
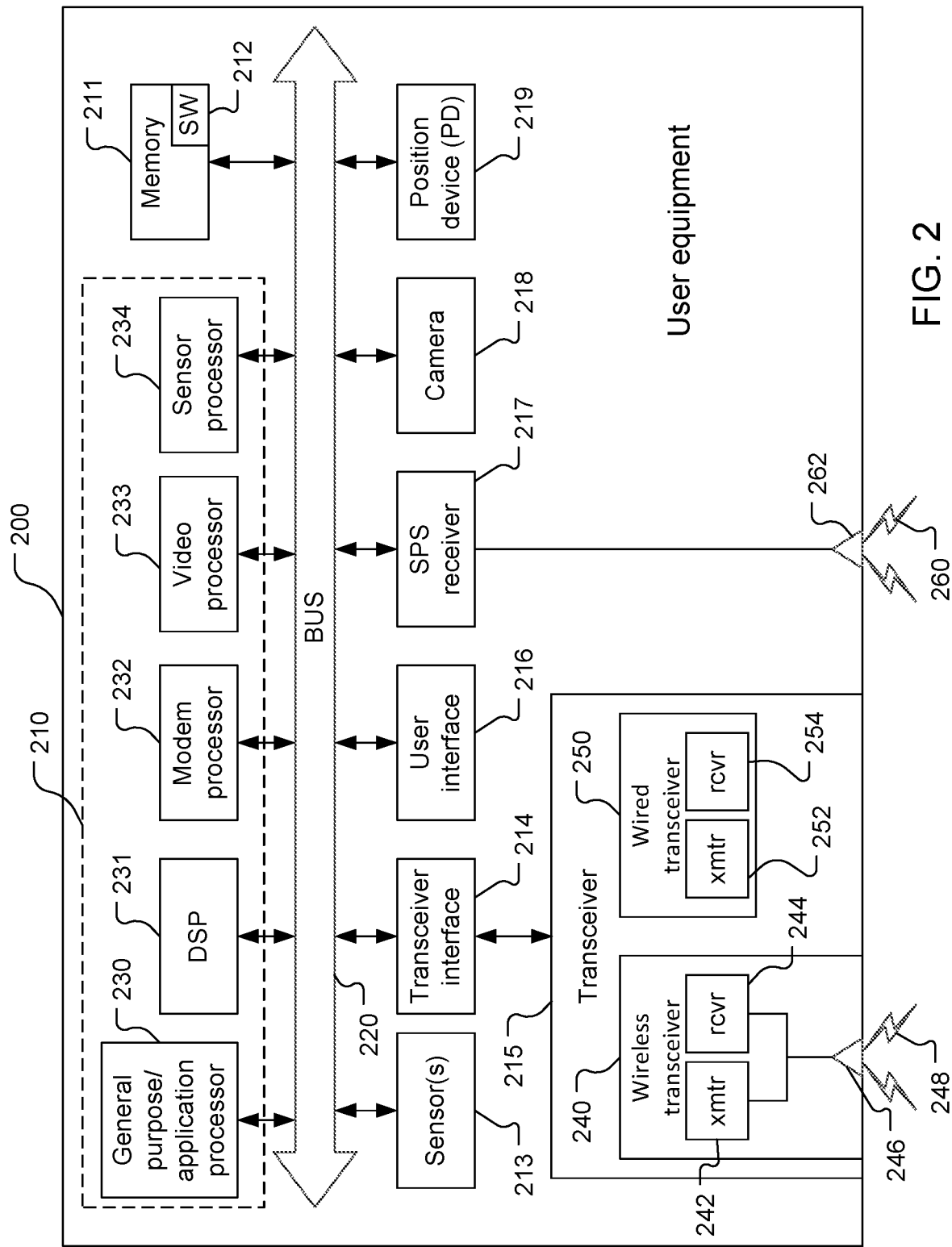
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. Alternatively, the magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
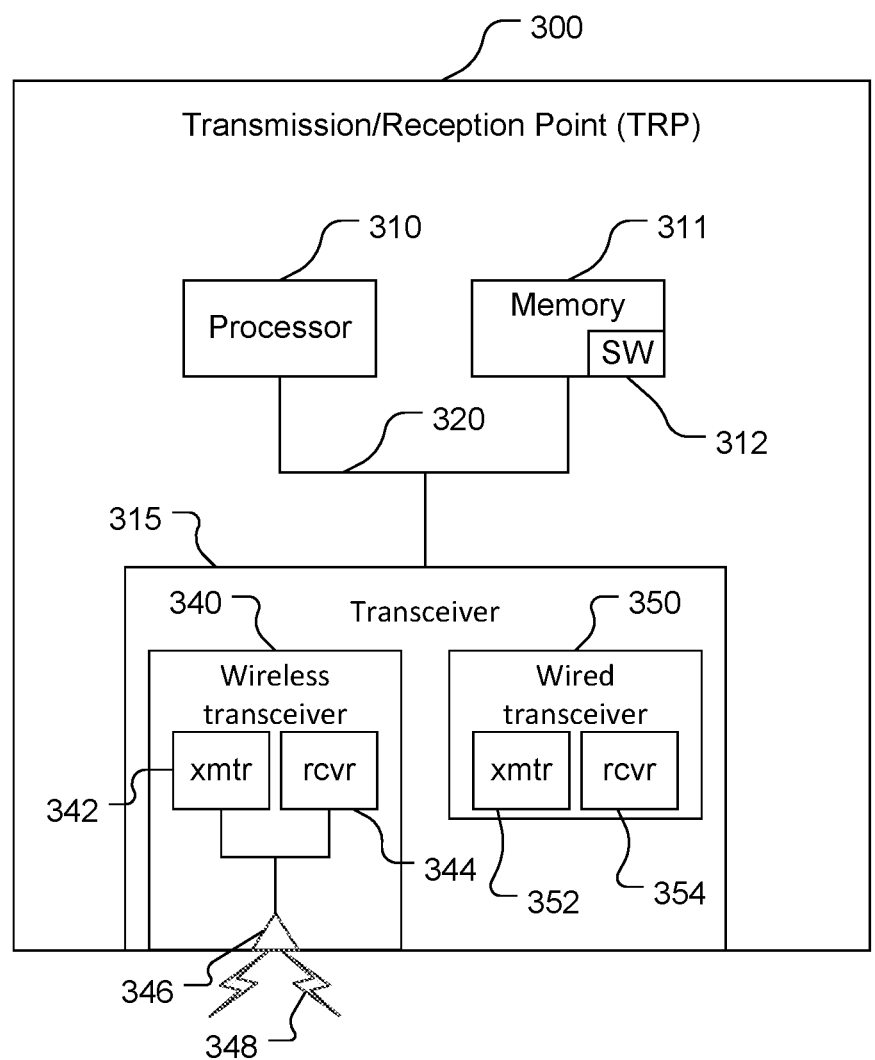
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
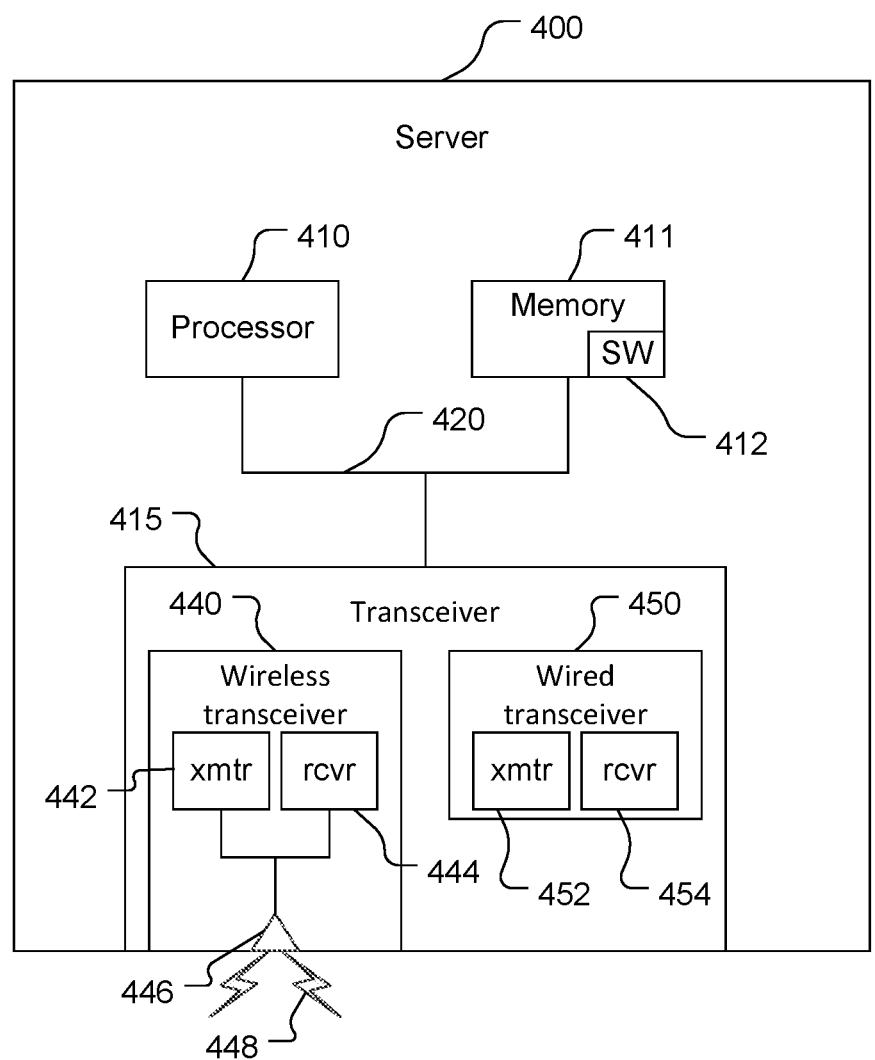
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

Supplemental-Uplink-Signal-Based Positioning

Figure 5A:
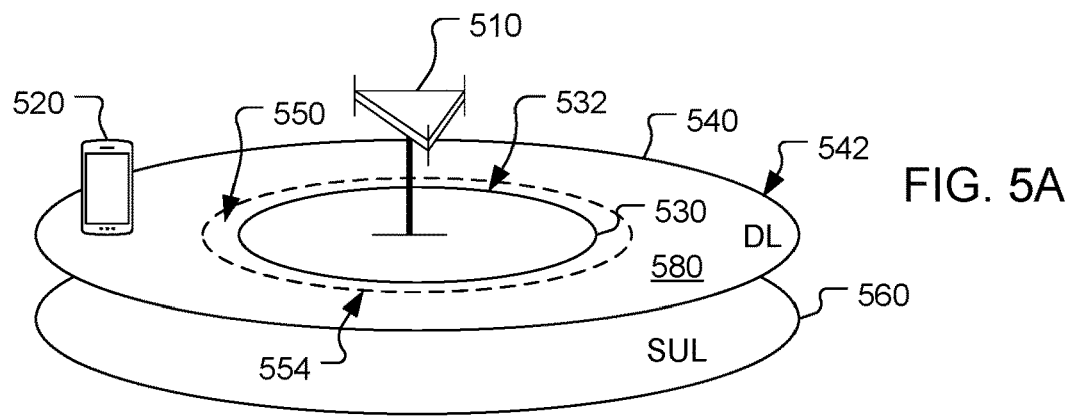
FIG. 5A is a perspective view of a base station, a user equipment, and coverage areas.

Referring to FIG. 5A, UL-based positioning methods depend on UL signals being received/measured, e.g., by a base station 510 from a UE 520. Because the base station 510 is typically connected to grid power and the UE 520 typically uses battery power, the transmission power available for DL signals from the base station 510 is typically greater than the transmission power available for UL signals from the UE 520. Consequently, a UL coverage area 530 is typically smaller than a DL coverage area 540 using new NR frequency bands at UHB (Ultra High Band) frequencies, e.g., above 3 GHz such as n77 (3.3 GHz-4.2 GHz), n78 (3.3 GHz-3.8 GHz), or n79 (4.4 GHz-5.0 GHz). The UL coverage area 530 is the area from which a serving cell of the base station 510 can receive/measure a UL signal in a primary band (e.g., a UHB band from the UE 520 without having to combine multiple instances of the UL signal from the UE 520. A marginal coverage-limited area 550 (in this example an annular region) just outside the UL coverage area 530, extending slightly (e.g., about 10%) beyond the UL coverage area 530, is an area from which the base station 510 can receive/measure a UL signal in a UHB band from the UE 520 by combining (e.g., integrating) multiple instances of the UL signal from the UE 520. The marginal coverage-limited area 550 is at the margin of the UL coverage area 530, extending beyond (from an outer edge 532 of) the UL coverage area 530 but not reaching the extent of the DL coverage area 540 (i.e., not extending to an outer edge 542 of the DL coverage area 540). If the UE 520 is beyond the marginal coverage-limited area 550, the base station 510 is unable to measure a UHB UL signal from the UE 520 even by combining multiple instances of the UL signal. A coverage-limited area 580 is an area in which the UE 520 may receive and measure DL signals from the base station 510 but from which the base station 510 is unable adequately to receive UL signals from the UE 520, e.g., is unable to receive UL signals with enough energy and/or quality to be measured using a single instance of a signal, or, possibly, with enough energy and/or quality to be measured at all (e.g., even with combining (e.g., integrating) multiple instances). The base station 510 may be unable to measure the UL signals from the UE 520 in the coverage-limited area 580 due to a transmit power limitation. For example, the coverage-limited area 520 may be an area where a desired transmit power (e.g., as determined by a power control equation) for the UL signals is higher than an available/allowable transmit power of the UE 520. The power control equation provides that a desired transmit power is the UL path loss between the UE 520 and the base station 510 (e.g., with UL path loss estimated as equal to a measured DL path loss) plus a received power of the UL signal for the base station 510 to measure the UL signal with one or more desired characteristics (e.g., with a single instance, with a desired measurement quality). If the available transmit power is below the desired transmit power, and the differential between the desired transmit power and the available/allowable transmit power is above a first threshold but below a second threshold, then the UE 520 is considered to be in the marginal coverage-limited area 550. If the differential between the desired transmit power and the available/allowable transmit power is above the second threshold, then the UE 520 is considered to be in a complete coverage-limited area (outside the marginal coverage-limited area 550). The coverage-limited area 580 occupies the area in the DL coverage area 540 that is outside the UL coverage area 530 (including the marginal coverage-limited area 550).

Figure 5B:
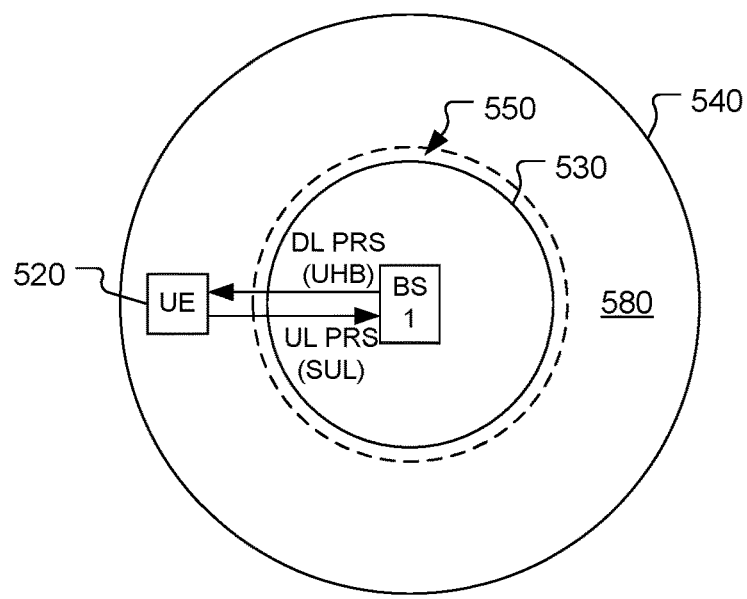
FIG. 5B is a top view of uplink and downlink coverage areas shown in FIG. 5A.
Figure 5C:
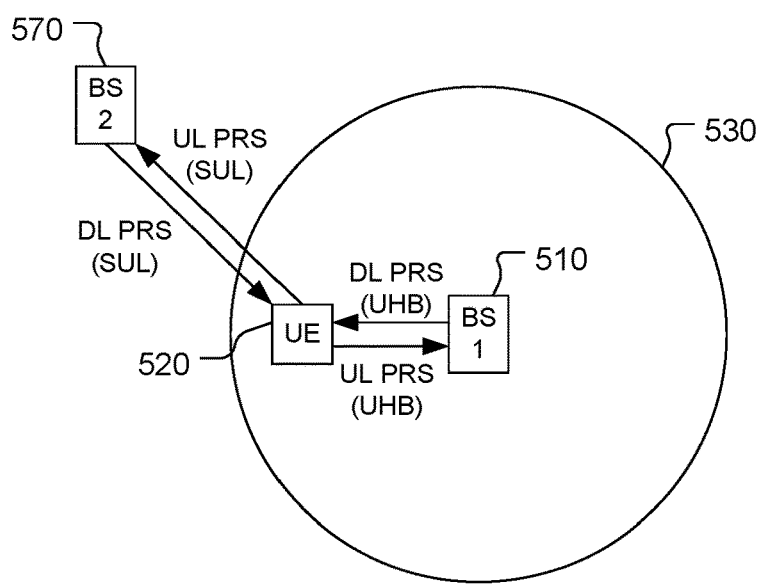
FIG. 5C is a top view of the user equipment, the base station, and the uplink coverage area shown in FIG. 5A, and another base station.

One or more supplemental uplink (SUL) bands, however, may be used to send UL PRS from a UE, e.g., the UE 520, to a companion cell of the base station 510 and/or DL PRS from the companion cell of the base station 510 to the UE, e.g., the UE 520. The companion cell is configured to transmit and/or receive signals of the SUL band and will typically be configured in a TRP distinct from a TRP of the serving cell, although the serving cell and the companion cell may be disposed at the same base station, e.g., the base station 510. The SUL band(s) has(have) frequencies below 3 GHz and may thus provide larger coverage areas for the same transmission power as a signal with a frequency above 3 GHz. For example, an SUL coverage area 560 may be about the same size as the DL coverage are 540 (or even bigger than the DL coverage area 540), with the companion cell and the serving cell both being located at the base station 510. SUL bands include n80 (1.71 GHz-1.785 GHz), n81 (880 MHz-915 MHz), n82 (832 MHz-862 MHz), n83 (703 MHz-748 MHz), n84 (1.92 GHz-1.98 GHz), n86 (1.71 GHz-1.78 GHz), n89 (824 MHz-849 MHz). Referring also to FIG. 5B, an SUL band may be used by the UE 520 to send UL PRS to improve UL-based positioning performance, e.g., enabling UL-based positioning techniques (e.g., UL-TDOA, RTT) with the UE 520 in the DL coverage area 540 but outside of the UL coverage area 530 (or even outside of the marginal coverage-limited area 550). Referring also to FIG. 5C, as another example, an SUL band may be used by the UE 520 to send UL PRS to enable multi-RTT with the UE 520 in the UL coverage area 530 of a serving cell of the base station 510, with a UHB band used to transmit UL PRS by the serving cell to the UE 520, and the SUL band used to transmit UL PRS to a companion cell, here of a base station 570. The UE 520 may use the SUL for carrier aggregation between frequency division duplex (FDD) and/or time division duplex (TDD) signals, and/or for ENDC (E-UTRA (Evolved Universal Mobile Telecommunications System (UMTS)) New Radio Dual Connectivity). The UE 520 may be configured to perform Tx switching, dynamically switching between transmission using different bands, e.g., between using an SUL band carrier and a carrier of a primary band (e.g., UHB band) and to share a transmit chain for the two bands.

Figure 6:
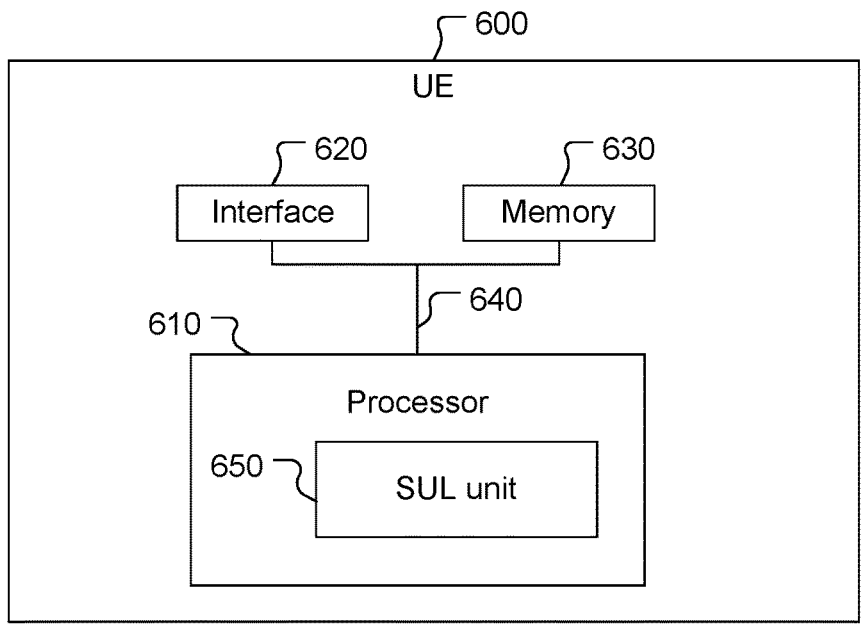
FIG. 6 is a block diagram of an example user equipment.

Referring to FIG. 6, with further reference to FIGS. 1-4, a UE 600 includes a processor 610, an interface 620, and a memory 630 communicatively coupled to each other by a bus 640. The UE 600 may include the components shown in FIG. 6, and may include one or more other components such as any of those shown in FIG. 2 such that the UE 200 may be an example of the UE 600. For example, the processor 610 may include one or more of the components of the processor 210. The interface 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 620 may include the wired transmitter 252 and/or the wired receiver 254. The memory 630 may be configured similarly to the memory 211, e.g., including software with processor-readable instructions configured to cause the processor 610 to perform functions.

The description herein may refer only to the processor 610 performing a function, but this includes other implementations such as where the processor 610 executes software (stored in the memory 630) and/or firmware. The description herein may refer to the UE 600 performing a function as shorthand for one or more appropriate components (e.g., the processor 610 and the memory 630) of the UE 600 performing the function. The processor 610 (possibly in conjunction with the memory 630 and, as appropriate, the interface 620) includes an SUL unit 650 configured to provide one or more indications of SUL capability of the UE 600, to determine whether to use an SUL band for UL PRS transmission, to transmit UL PRS using allocated resources in an SUL band, to determine whether to use an SUL band for DL PRS reception, and to measure DL PRS in an SUL band (e.g., including tuning an antenna for SUL band reception during a measurement gap). The SUL unit 650 is discussed further below, and the description may refer to the processor 610 generally, or the UE 600 generally, as performing any of the functions of the SUL unit 650.

Figure 7:
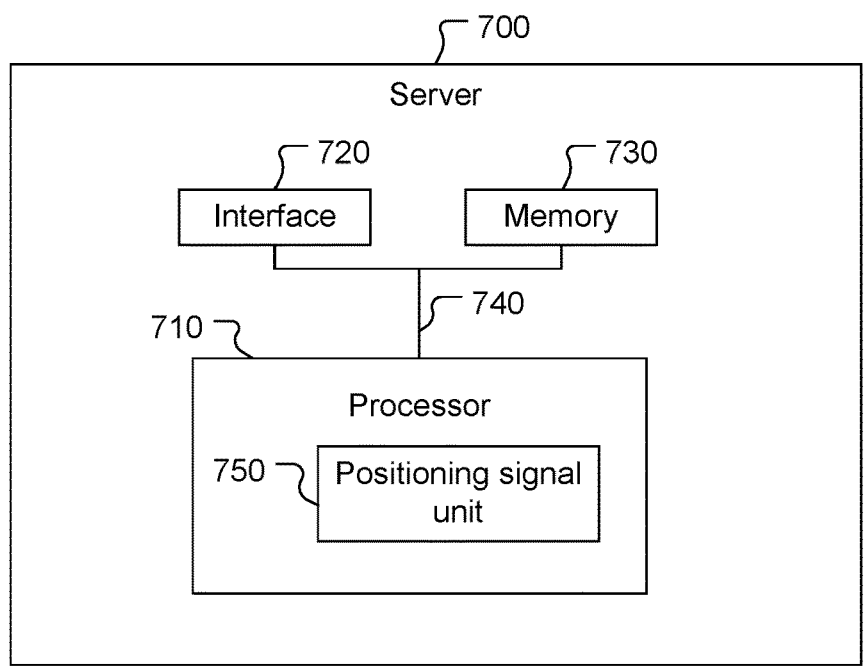
FIG. 7 is a block diagram of an example server.

Referring also to FIG. 7, a server 700 includes a processor 710, an interface 720, and a memory 730 communicatively coupled to each other by a bus 740. The server 700 may include the components shown in FIG. 7, and may include one or more other components such as any of those shown in FIG. 4 such that the server 400 may be an example of the server 700. For example, the interface 720 may include one or more of the components of the transceiver 415, e.g., the wireless transmitter 442 and the antenna 446 and/or the wireless receiver 444 and the antenna 446. Also or alternatively, the interface 720 may include the wired transmitter 452 and/or the wired receiver 454. The memory 730 may be configured similarly to the memory 411, e.g., including software with processor-readable instructions configured to cause the processor 710 to perform functions.

The description herein may refer only to the processor 710 performing a function, but this includes other implementations such as where the processor 710 executes software (stored in the memory 730) and/or firmware. The description herein may refer to the server 700 performing a function as shorthand for one or more appropriate components (e.g., the processor 710 and the memory 730) of the server 700 performing the function. The processor 710 (possibly in conjunction with the memory 730 and, as appropriate, the interface 720) includes a positioning signal unit 750. The positioning signal unit 750 is configured to coordinate with one or more appropriate entities (e.g., cells) to allocate and/or schedule PRS resources, e.g., DL PRS resources and UL PRS resources. The supplemental signal may be separate from the DL PRS or may be part of the DL PRS (e.g., tones of multiple PRS that overlap in frequency between the multiple PRS). The positioning signal unit 750 may schedule and transmit the PRS and the supplemental signal based on one or more indicated capabilities of the UE 600 to process multiple PRS in combination with the aid of a supplemental signal. The positioning signal unit 750 is discussed further herein, and the description may refer to the processor 710 generally, or the server 700 generally, as performing any of the functions of the positioning signal unit 750.

Figure 8:
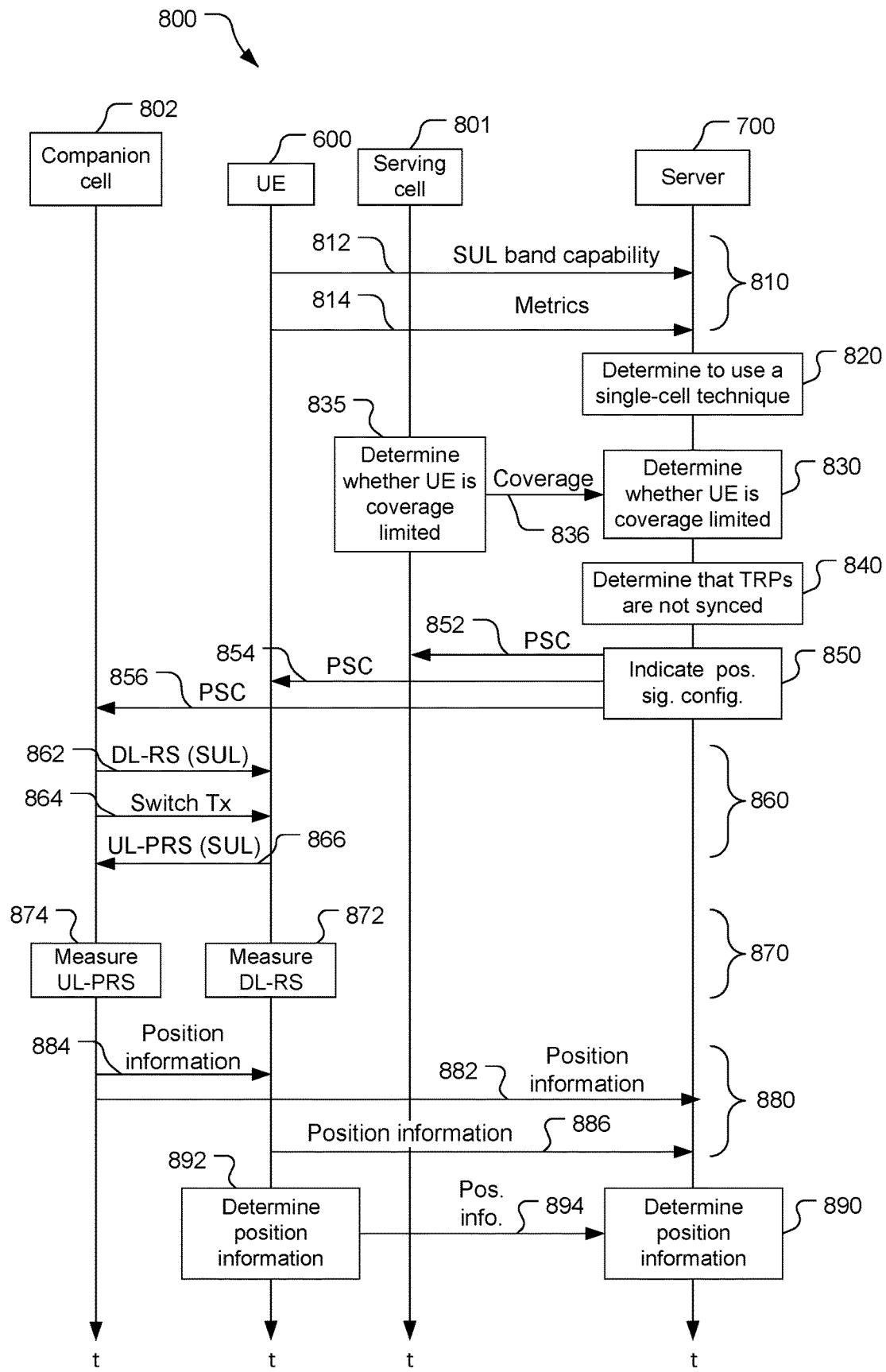
FIG. 8 is a timing diagram of a signaling and process flow for determining position information using one or more uplink positioning reference signals using a single-cell positioning technique.

Referring to FIG. 8, with further reference to FIGS. 1-7, a signaling and process flow 800 for determining position information using UL PRS (SRS for positioning) over an SUL band includes the stages shown. The position information is determined using one or more UL-based positioning techniques. The flow 800 is an example only, as stages may be added, rearranged, and/or removed.

At stage 810, the UE 600 sends an SUL band capability message 812 to the server 700. For example, the SUL unit 650 may be configured to send indications of the capability of the UE 600 to use a supplemental uplink band, and may be configured to send the indications during a session start (e.g., a start of a positioning session between the UE 600 and the server 700). The SUL band capability message 812 may indicate a capability of the UE 600 to send UL PRS over one or more indicated SUL bands. The SUL band capability message may indicate a capability of the UE 600 to receive DL PRS over one or more indicated SUL bands. The SUL unit 650 may be configured to produce and send the SUL band capability message 812 to indicate one or more band combinations supported by the UE 600, each band combination indicating a UHB band and an SUL band and indicating which band(s) may be used by the UE 600 for receiving PRS and transmitting PRS. For example, referring also to FIG. 9, an example SUL band capability message 900 includes a band combination field 910, a band field 920, a UL band field 930, and a DL band field 940. The UL band field 930 and the DL band field 940, in this example, each include a low-end frequency subfield and a high-end frequency subfield. The message 900, in this example, includes two entries 950, 960 indicating respective combinations of one UHB band and one SUL band supported by the UE 600, with the entries 950, 960 including sub-entries for the separate bands. In the example message 900, frequencies are shown in MHz and the message 900 indicates that for a band combination of n78-n80 (entry 950) the UE 600 is configured to support UL and DL in UHB band n78, and only UL in SUL band n80, and that for a band combination of n79-n81 (entry 960) the UE 600 is configured to support UL and DL in UHB band n78 and in SUL band n81. The UE 600 may use the UHB band to communicate with the server 700, e.g., via a serving cell 801, for data and/or PRS.

Figures 9, 10:
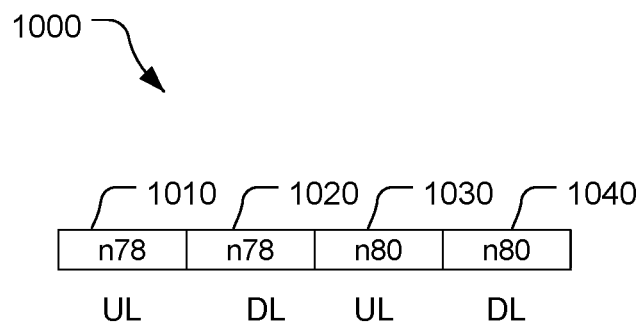
FIG. 9 is an example of a supplemental uplink band capability message.
FIG. 10 is another example of a supplemental uplink band capability message.

Configurations of SUL band capability messages other than the SUL band capability message 900 may be used. For example, one or more of the indications shown in the message 900 may be omitted, being implied by coded indications, e.g., indications in a format such that locations in the format correspond to respective information (e.g., respective UL band, respective DL band, etc.). Referring also to FIG. 10, an example SUL band capability message 1000 includes a first UL band indication 1010, a first DL band indication 1020, a second UL band indication 1030, and a second DL band indication 1040. The locations of the indications 1010, 1020, 1030, 1040 correspond to the respective meanings of the indications 1010, 1020, 1030, 1040. In this example, the SUL band capability message 1000 indicates that the UE 600 is configured to support UL band n78, DL band n78, UL band n81, and DL band n81, with band n78 (3300 MHz-3800 MHz) being a UHB band and band n81 (800 MHz-915 MHz) being an SUL band. The values of the indications 1010, 1020, 1030, 1040 may be coded indications as in this example, with frequency band labels provided that correspond to known frequency ranges.

The UE 600 may also send a metrics message 814 to the server 700. The metrics message 814 may include indications of transmit power used by the UE 600 to send signals, e.g., UL data, UL PRS, etc. The metrics message 814 may include an indication of the path loss between the UE 600 and the serving cell 801. The UE 600 may be configured to send the metrics message 814 and the SUL band capability message 812 using LPP. The UE 600 may send the message 812 and/or the message 814 directly to the server 700 and/or via a serving cell 801 using a primary band (a communication band) while the serving cell 801 is within UL range of the UE 600 (within a UL coverage area of the serving cell 801).

At stage 820, the server 700 determines to use a single-measurement positioning technique to determine the position of the UE 600. The server 700 may determine whether to use a single-measurement or multi-measurement technique. In the flow 800, the server 700 determines to use a single-measurement technique, and the server 700 determines to use a multi-measurement technique in a flow 1200, shown in FIG. 12 and discussed below. The server 700 may, for example, determine whether a single-measurement or multi-measurement technique has been requested. As another example, the server 700 may determine whether a single-measurement technique or a multi-measurement technique is required and/or better in order to meet one or more criteria, e.g., position accuracy, latency, etc. A single-measurement positioning technique may involve multiple cells to determine the measurement, e.g., with a single-measurement RTT technique potentially involving the serving cell 801 transmitting a DL signal to the UE 600 using a primary band and the UE 600 transmitting a UL signal to a companion cell 802 using a supplemental band. Measurements of the DL-RS and the UL-RS are processed to determine a single RTT measurement.

At stage 830, the server 700 determines whether the UE 600 is coverage limited. For example, the server 700 may receive (e.g., directly and/or from the serving cell 801) an indication of the received signal strength of downlink signals at the UE 600 power presently used for communicating with the serving cell 801 and compare that with one or more thresholds. If the received power is less than a threshold, then the server 700 may conclude that the UE 600 is coverage limited. The threshold may be statically configured by a manufacturer of the UE 600 and/or dynamically configurable, e.g., by received information (which may override a statically-configured threshold). As another example, if the serving cell 801 indicates that multiple instances of a UL signal from the UE 600 are needed to measure the UL signal, then the server 700 may conclude that the UE 600 is in a marginal coverage-limited area of the serving cell 801. As another example, if the server 700 determines from a location estimate of the UE 600 (e.g., determined by E-CID) that the UE 600 is disposed within a DL coverage area of the serving cell 801 but the serving cell 801 provides no indication of a measurement of a UL signal from the UE 600, then the server 700 may conclude that the UE 600 is disposed outside of the UL coverage area and outside of the marginal coverage-limited area for the serving cell 801. As another example, the server 700 may determine the outer edge 532 of the UL coverage area 530 and the outer edge 554 of the marginal coverage-limited area 550 based on the transmit power, and determine if the UE 600 is in the area 530 or the area 550 based on the location estimate. As another example, the server 700 may receive (e.g., directly from the UE 600, from the serving cell 801, and/or from another entity) an indication of the transmit power presently used by the UE 600 for transmitting UL signals and may receive an indication of a path loss between the serving cell 801 and the UE 600, e.g., via the serving cell 801 if the UE 600 is not coverage limited and via another cell if the UE 600 is coverage limited with respect to the serving cell 801. The processor 710 may be configured to determine that the UE 600 is coverage limited if the transmit power minus the path loss is below a threshold. As another example, the processor 710 may be configured to determine that the UE 600 is coverage limited if the received power of a signal transmitted by the UE 600 is below a threshold power. As another example, the processor 710 may be configured to determine that the UE 600 is coverage limited if the path loss exceeds the transmit power and thus that the UE 600 is in the coverage-limited area 580 (inside a DL coverage area, e.g., the DL coverage area 540, but outside a UL coverage area, e.g., the UL coverage area 530), such as shown in FIGS. 5A and 5B. For example, the processor 710 may be configured to determine that the UE 600 is outside of the UL coverage area if the serving cell 801 is only able to receive and measure a UL signal from the UE 600 by combining multiple instances of the UL signal (e.g., integrating instances over time). The processor 710 may be configured to determine whether the UE 600 is outside of a marginal coverage-limited area, e.g., the marginal coverage-limited area 550. The processor 710 may be configured, for example, to determine that the UE 600 is in the marginal coverage-limited area 550 based on a present transmit power limit of the UE 600 being less than a desired transmit power by more than a first threshold amount but less than a second threshold amount, and outside of the marginal coverage-limited area 550 based on the present transmit power being less than the desired transmit power by more than the second threshold amount, with the desired transmit power being determined by a power control equation (which depends on the path loss and thus a location estimate for the UE 600 (e.g., using E-CID)).

At stage 835, the serving cell 801 may determine whether the UE is coverage limited. For example, the serving cell 801 may obtain the transmit power of the UE 600 and the path loss between the UE 600 and the serving cell 801, e.g., calculating path loss based on received signal power at the UE 600 and transmit power at the serving cell 801 or being provided with an indication of path loss from the UE 600. The serving cell 801 may determine whether the UE 600 is coverage limited and provide a coverage message 836 to the server 700 as to whether the UE 600 is coverage limited and the server 700 may determine that the UE is coverage limited by receiving and reading the coverage message 836. For example, the processor 310 may send an indication (e.g., a Boolean indication) indicating that the UE 600 is outside the UL coverage area 530, outside the marginal coverage-limited area 550, or inside the UL coverage area 530. The server 700 may determine whether the UE is coverage limited at stage 830 using (e.g., reading) this indication from the serving cell 801 or independently of this indication (e.g., if the coverage message 836 is not sent by the serving cell 801).

At stage 840, the server 700 determines whether the serving cell 801 and the companion cell 802 are synced. For example, the server 700 may determine whether the serving cell 801 and the companion cell 802 are synced, with the companion cell 802 being within range (e.g., at least using the SUL band) of the UE 600 (e.g., based on a coarse position estimate of the UE 600 or based on the serving cell

801 and the companion cell 802 being disposed in close proximity, e.g., being part of the same base station). The cells 801, 802 are synced if clocks of the cells 801, 802 are synchronous or if an offset between the clocks is known. The serving cell 801 and the companion cell 802 may be physically disposed in a single base station or disposed is physically-separate base stations. The server 700 determines that the cells 801, 802 are not synced in the flow 800 and determines that the cells 801, 802 are synced in a flow 1100 shown in FIG. 11 and discussed below.

At stage 850, the server 700 indicates a positioning signal configuration based on the UE 600 being in the coverage-limited area, a single-measurement positioning technique to be used, and the serving cell 801 and the companion cell 802 not being synced (or the serving cell 801 simply not desired to be used). The server 700 coordinates with the companion cell 802 to determine resources to be used for DL-RS and UL-RS. For example, the positioning signal unit 750 may be configured to determine the SUL band that is a companion band of the band used between the UE 600 and the serving cell 801 for communication. The positioning signal unit 750 may know the band used by the UE 600 and the serving TRP for communication and may analyze the message 900 to find the band that is used by the UE 600 and the serving cell 801 for communication, and find the corresponding SUL band that is supported by the UE 600, i.e., the SUL band in the band combination that includes the band used by the UE 600 and the serving cell 801 for communication. For example, if the UE 600 and the serving cell 801 are using band n79 for communication, the positioning signal unit 750 may determine from the message 900 that band n81 is the companion band supported by the UE 600 for SUL transmissions. The positioning signal unit 750 coordinates with the companion cell 802 to determine UL-PRS resources, e.g., OFDM (Orthogonal Frequency Division Multiplexed) UL-PRS resources, in the companion SUL band, and coordinates with the serving cell 801 to determine DL-RS resources, e.g., OFDM DL-PRS resources and/or OFDM DL-SSB resources, in the companion SUL band. The positioning signal unit 750 may coordinate directly with the companion cell 802 or indirectly via the serving cell 801. The UL-PRS resources and DL-RS resources are both allocated in the SUL in view of the serving cell 801 and the companion cell 802 being out of sync (or the SUL band being selected for DL-RS and UL-RS even if the cells 801, 802 are in sync). The server 700 transmits positioning signal configuration (PSC) messages 852, 854, 856 to the serving cell 801, the UE 600, and the companion cell 802, respectively, indicating the determined UL-PRS resources configuration and the determined DL-RS resources configuration. For example, the message 852 may indicate the DL-RS resources configuration or may be an acknowledgement of a DL-RS resources configuration provided by the serving cell 801 to the server 700. The message 854 may be assistance data indicating the DL-RS resources configuration and the UL-PRS resources configuration, although this information may come from the serving cell 801 and the companion cell 802, respectively. The message 856 may be transmitted directly to the companion cell 802 or to the companion cell 802 via the serving cell 801, and may indicate the UL-PRS resources configuration or may be an acknowledgement of a UL-PRS resources configuration provided by the companion cell 802 to the server 700. The server 700 may send the message 854 to the UE 600 via the serving cell 801. The message 856 may be viewed as part of an exchange between the server 700 and the companion cell 802 to determine the UL-PRS resources, the message 854 may be viewed as an indication from the serving cell 801 of the resources determined between the companion cell 802 and the server 700 to be used for DL-RS and UL-RS, and the message 852 may be viewed as part of an exchange between the server 700 and the serving cell 801 to determine the DL-RS resources. Instead of coordinating with the cells 801, 802 to allocate, and indicating, both UL-PRS resources and DL-RS resources in the SUL band, the server 700 could coordinate to allocate, and indicate, the UL-PRS resources in the SUL band and DL-RS resources in the communication band (as discussed below with respect to stage 1150 of FIG. 11) although positioning errors may result due to the lack of synchronization between the cells 801, 802.

At stage 860, the companion cell 802 and the UE 600 exchange positioning signals in accordance with the indicated resources. The serving companion cell 802 sends one or more DL-RS 862 in the companion SUL band to the UE 600. The companion cell 802, having received the positioning signal configuration message 856 from the server 700, configures the UE 600 to transmit the UL-PRS by sending one or more switch Tx messages 864 to the UE 600. The switch Tx message(s) 864 may include DCI (Downlink Control Information) indicators and indicate to the UE 600 to switch transmission to the SUL band (from another band such as the communication band) based on the UL-PRS schedule determined at stage 850. The UE 600, e.g., the SUL unit 650, sends one or more UL-PRS 866 in the companion SUL band to the serving companion cell 802. Thus, the UE 600 and the companion cell 802 can, for example, perform RTT measurements on the SUL band through Tx switching, with the companion cell 802 and the UE 600 coordinating transmission of positioning signals using the SUL band.

At stage 870, the positioning signals are measured. At sub-stage 872, the UE 600, e.g., the SUL unit 650, measures the DL positioning signal(s) 862 (e.g., the DL-PRS and/or the SSB(s)). At sub-stage 874, the companion cell 802 measures the UL-PRS 866. The measurements may yield various information such as received power, received power relative to a reference power, time of arrival, time of arrival relative to a reference signal, etc.

At stage 880, the UE 600 and/or the companion cell 802 transmit(s) position information. For example, the companion cell 802 may send one or more measurements and/or one or more processed measurements (e.g., estimated UE location(s), pseudorange(s), offset(s), etc.), based on processing of one or more measurements, in a position information message 882 to the server 700. The companion cell 802 may also or alternatively send one or more measurements and/or one or more processed measurements to the UE 600 in a position information message 884, e.g., for UE-based positioning. The UE 600 may send one or more measurements and/or one or more processed measurements to the server 700 in a position information message 886, e.g., for UE-assisted positioning (and/or UE-based positioning if the message 886 includes an estimated UE location).

At stage 890, the server 700 may determine position information. The server 700 may collect position information from one or more of the position information messages 882, 886 and perform one or more positioning techniques to determine further position information for, e.g., the location of, the UE 600, and/or may provide information to another entity for calculation of position information. The server 700 may use position information from the message(s) 882, 886 to update previously-determined position information for the UE 600.

At stage 892, the UE 600 may determine position information. The UE 600 may collect position information from the position information message(s) 884 and perform one or more positioning techniques to determine further position information for, e.g., the location of, the UE 600, and/or may provide information to another entity, e.g., the server 700, for calculation of position information. The UE 600 may use position information from the message(s) 884 to update previously-determined position information for the UE 600. The UE 600 may send a position information message 894 to the server 700 with position information determined by the UE 600 at stage 892.

Figure 11:
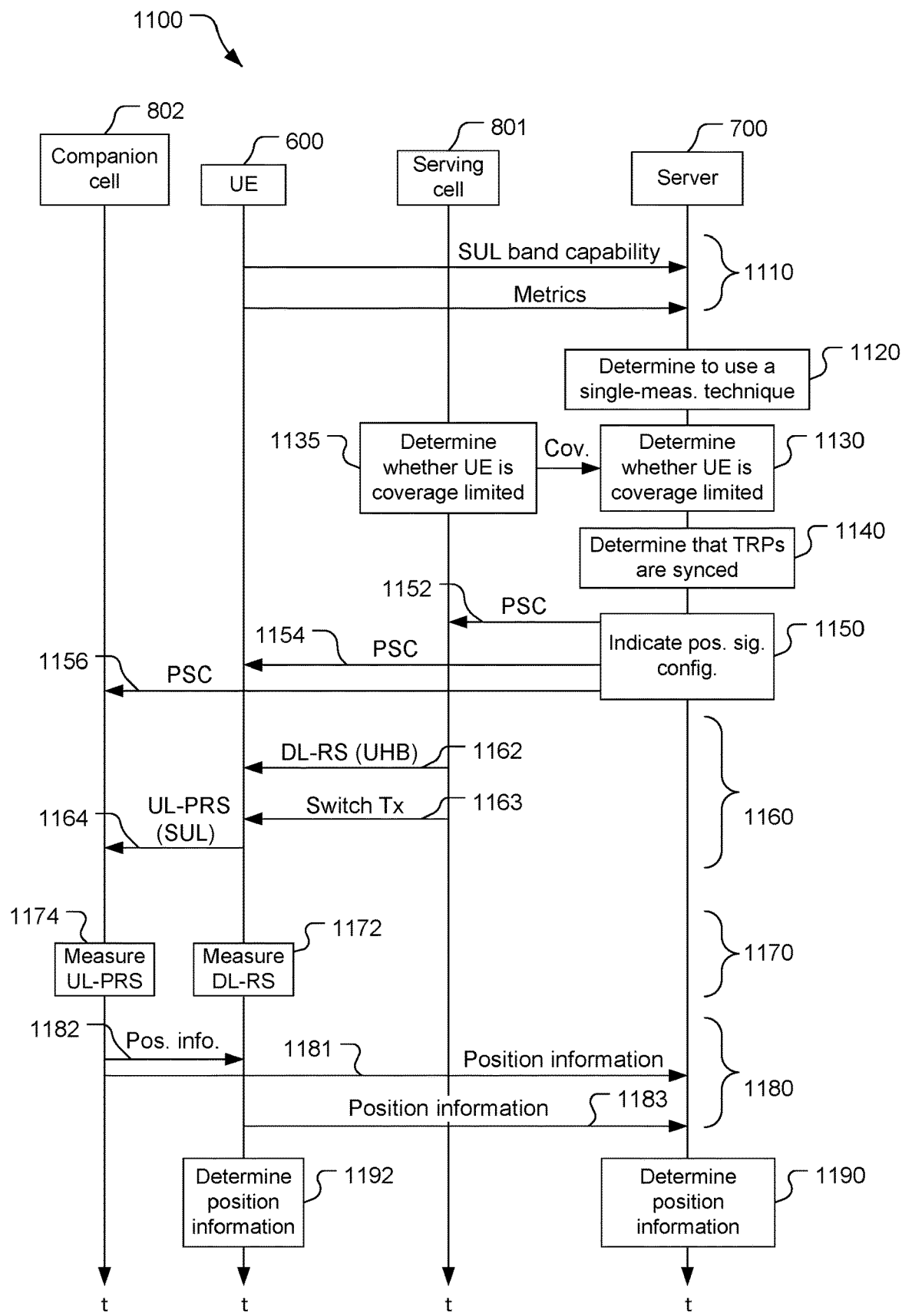
FIG. 11 is a timing diagram of another signaling and process flow for determining position information using one or more uplink positioning reference signals using a single-cell positioning technique with synced cells.

Referring to FIG. 11, with further reference to FIGS. 3-8, a signaling and process flow 1100 for determining position information using UL PRS (SRS for positioning) over an SUL band includes the stages shown. The position information is determined using one or more UL-based positioning techniques. The flow 1100 is an example only, as stages may be added, rearranged, and/or removed. In the flow 1100, stages 1110, 1120, 1130, 1135 may be the same as stages 810, 820, 830, 835 discussed above.

At stage 1140, the server 700 determines whether the serving cell 801 and the companion cell 802 are synced, e.g., similarly to the stage 840. At stage 1140, contrary to stage 840, the server 700 determines that the serving cell 801 and the companion cell 802 are synced.

At stage 1150, the server 700 indicates positioning signal configurations based on the UE 600 being in the coverage-limited area, a single-measurement positioning technique to be used, and available cells being synced. The positioning signal unit 750 may coordinate and indicate positioning signal resources in a manner similar to the manner discussed with respect to stage 850, or may coordinate and indicate positioning signal resources for interaction between the UE 600 and the cells 801, 802 in view of the cells 801, 802 being in sync. For example, the positioning signal unit 750 may be configured to determine whether to coordinate allocation of positioning signal resources for the serving cell 801 only or for the serving cell 801 and the companion cell 802 based on a desired (e.g., requested) positioning accuracy, e.g., resources for the cells 801, 802 based on a positioning accuracy being higher than a threshold accuracy (e.g., a positioning error being below an error threshold). The server 700 may send positioning signal configuration (PSC) messages 1152, 1154, 1156 to the serving cell 801, the UE 600, and the companion cell 802 (directly, or indirectly via the serving cell 801), respectively. The messages 1152, 1154, 1156 indicate (e.g., provide or provide acknowledgement of) OFDM DL-RS resources on the communication band (UHB) and OFDM UL-PRS resources on the SUL band. The serving cell 801 and the companion cell 802 may be physically disposed in a single base station or disposed is physically-separate base stations, although with the serving cell 801 using ultra-high frequency and the companion cell 802 using low frequency, the cells 801, 802 will typically not be co-located.

At stage 1160, the serving cell 801, the companion cell 802, and the UE 600 exchange positioning signals in accordance with the indicated resources. The serving cell 801 sends one or more DL-RS 1162 in the communication band to the UE 600. The serving cell 801 sends one or more Tx switch instructions 1163, e.g., in one or more DCI indications, for the UE 600 to switch to the SUL band for sending UL-PRS. The UE 600, e.g., the SUL unit 650, responds to the switch Tx instruction(s) 1163 by sending one or more UL-PRS 1164 in the companion SUL band to the companion cell 802.

At stage 1170, the positioning signals are measured. At sub-stage 1172, the UE 600, e.g., the SUL unit 650, measures the DL-RS 1162 (e.g., DL-PRS and/or SSB(s)). At sub-stage 1174, the companion cell 802 measures the UL-PRS 1164. The measurements may yield various information such as received power, received power relative to a reference power, time of arrival, time of arrival relative to a reference signal, etc.

At stage 1180, the UE 600 and/or the companion cell 802 sends position information. For example, the companion cell 802 may transmit one or more measurements and/or one or more processed measurements (e.g., estimated UE location(s), pseudorange(s), offset(s), etc.) of the DL-RS 1162 based on processing of one or more measurements, in position information message 1181 to the server 700. The companion cell 802 may also or alternatively send one or more measurements and/or one or more processed measurements of the UL-PRS 1164 to the UE 600 in a position information message 1182, e.g., for UE-based positioning. The UE 600 may send one or more measurements and/or one or more processed measurements to the server 700 in a position information message 1183, e.g., for UE-assisted positioning (or UE-based positioning with the message 1183 including a location estimate).

At stages 1190, 1192, the server 700 and/or the UE 600 may determine position information from measured signal(s) and/or position information received at stage 1180, similar to the discussion of stages 890, 892. The server 700 and/or the UE 600 uses signal measurements from the UE 600 and the companion cell 802 to determine a single RTT measurement.

Figure 12:
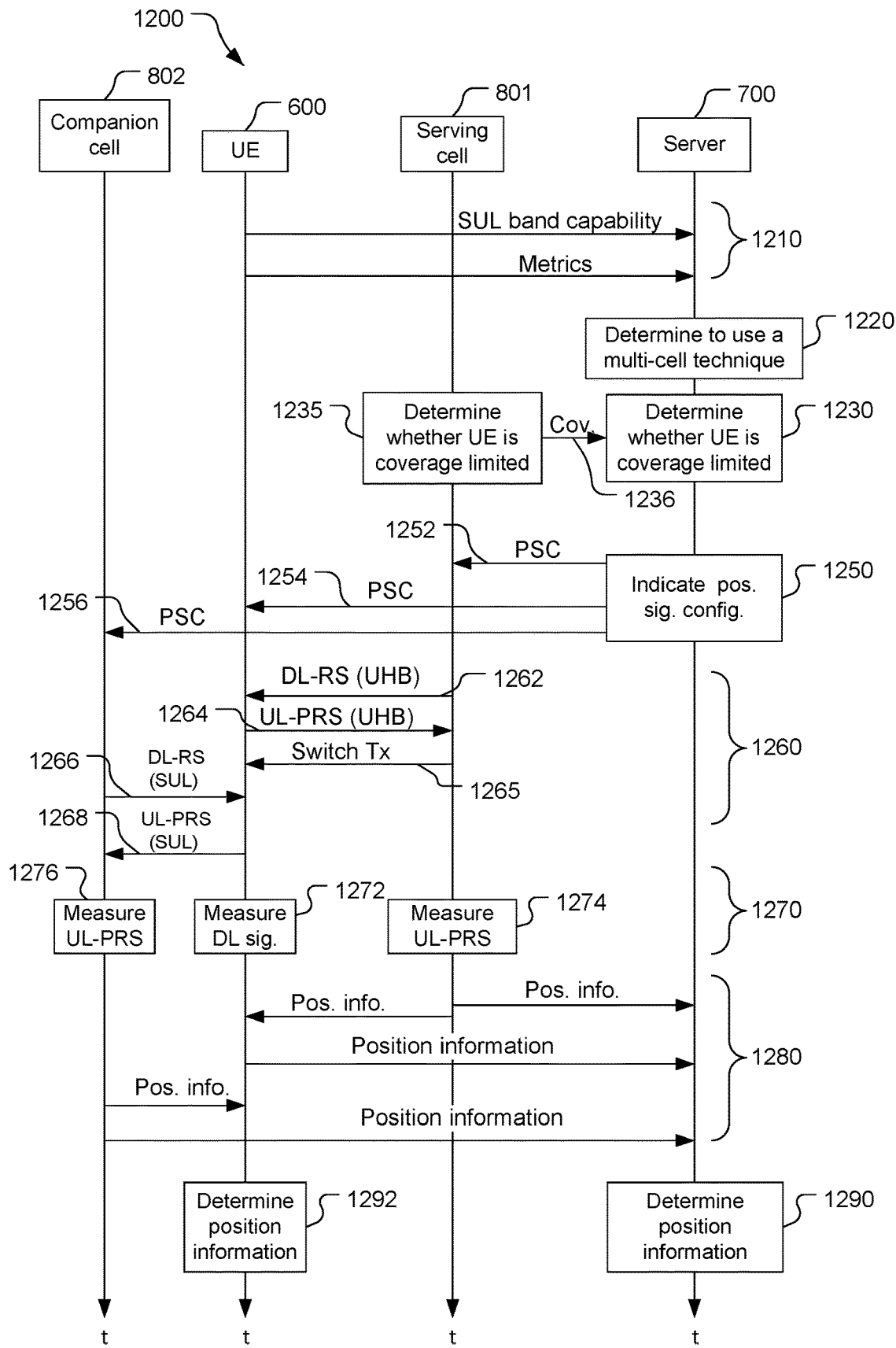
FIG. 12 is a timing diagram of another signaling and process flow for determining position information using one or more uplink positioning reference signals using a multi-cell positioning technique.

Referring to FIG. 12, with further reference to FIGS. 3-8, a signaling and process flow 1200 for determining position information using UL-PRS (SRS for positioning) over an SUL band includes the stages shown. The position information is determined using one or more UL-based positioning techniques. The flow 1200 is an example only, as stages may be added, rearranged, and/or removed. In the flow 1200, stage 1210 may be the same as stage 810 discussed above. The flow 1200 provides an example for multi-RTT positioning, particularly with respect to stages 1260, 1270, but the techniques discussed may be applied to other positioning techniques.

At stage 1220, the server 700 determines to use a multi-measurement positioning technique, e.g., multi-RTT, to determine the position of the UE 600. The server 700 may determine whether to use a single-measurement or multi-measurement technique as discussed with respect to FIG. 8 and stage 820. In this example, the server 700 determines that a multi-measurement positioning technique is to be used, e.g., has been requested or is appropriate to provide a requested positioning accuracy.

At stage 1230 and/or stage 1235, the server 700 and/or the serving cell 801 determines whether the UE 600 is coverage limited. For example, at stage 1230, the server 700 may determine that the UE 600 is not in a coverage-limited area (e.g., the coverage-limited area 580), i.e., is in a UL coverage area (e.g., the UL coverage area 530) or in a marginal coverage-limited area (e.g., the marginal coverage-limited area 550). For example, the server 700 may determine that the transmit power of the UE 600 is less than the path loss between the serving cell 801 and the UE 600 or that the serving cell 801 is able to measure a signal received from the UE 600 using only one instance of the signal. The server 700 may determine that the UE 600 is in the marginal coverage-limited area based on the transmit power of the UE 600 exceeding a path loss between the UE 600 and the serving cell 801 but the serving cell 801 being able to measure a signal from the UE 600 by combining multiple instances of the signal. As another example, the server 700 may determine that the UE 600 is in a marginal coverage-limited area based on the path loss exceeding the transmit power of the UE by less than a threshold amount. The determination may be made by the serving cell 801 at stage 1235 and a coverage indication 1236 provided to the server 700. The server 700 may make the coverage determination at stage 1230 with or without the coverage indication 1236.

At stage 1250, the server 700 indicates positioning signal configurations based on a multi-cell positioning technique (e.g., multi-RTT) to be used and based on the UE 600 not being coverage limited or being in the marginal coverage-limited area. The stage 1250 may be similar to the stage 850, but in stage 1250 the server 700 determines the companion SUL band and coordinates allocation of OFDM resources for the communication band (e.g., UHB) for UL and DL and also OFDM resources for the SUL band for UL and DL. For example, the server 700, e.g., the positioning signal unit 750, may coordinate (with the serving cell 801) allocation of OFDM resources for UL and DL on the communication band between the serving cell 801 and the UE 600, and coordinate (with the companion cell 802) OFDM resources for UL and DL on the SUL band between the companion cell 802 and the UE 600. All of the allocations may be included in each of positioning signal configuration messages 1252, 1254, 1256 that indicate the configurations (e.g., include the configurations or acknowledge the configurations). Alternatively, the message 1252 may indicate the allocations for the communication band and not the allocations for the SUL band, and the message 1256 may indicate the allocations for the SUL band and not the allocations for the communication band. The serving cell 801 and the companion cell 802 may be physically disposed in a single base station or disposed in physically-separate base stations. The configuration message 1256 may be transmitted directly from the server 400 to the companion cell 802 or indirectly via the serving cell 801.

At stage 1260, the serving cell 801, the companion cell 802, and the UE 600 exchange positioning signals in accordance with the indicated resources. The serving cell 801 sends one or more DL-RS 1262 in the communication band to the UE 600 and the UE 600 sends UL-PRS 1264 in the communication band to the serving cell 801. The serving cell 801 sends one or more Tx switch instructions 1265, e.g., in DCI indication(s), (based on the received positioning signal configuration message 1252) for the UE 600 to switch to the SUL band for sending UL-PRS. The companion cell 802 sends one or more DL-RS 1266 and the UE 600, e.g., the SUL unit 650, responds to the switch Tx instruction(s) 1265 by sending one or more UL-PRS 1268 in the companion SUL band to the companion cell 802.

At stage 1270, the positioning signals are measured. At sub-stage 1272, the UE 600 measures the DL-RS 1262 (e.g., DL-PRS and/or SSB(s)) from the serving cell 801 and from the companion cell 802. The UE 600 may use a legacy measurement gap (MG) configuration to tune away from the communication band, autonomously tune to the SUL band, and measure the DL-RS 1266 on the SUL band. At sub-stage 1274, the serving cell 801 measures the UL-PRS 1264. At sub-stage 1276, the companion cell 802 measures the UL-PRS 1268. The measurements may yield various information such as received power, received power relative to a reference power, time of arrival, time of arrival relative to a reference signal, etc. The measurements may be RTT measurements for supporting a multi-RTT positioning technique.

At stage 1280, similar to stage 1180 discussed above, the UE 600 and/or the serving cell 801 and/or the companion cell 802 sends position information to the UE 600 and/or to the server 700, respectively. For example, the serving cell 801 and the companion cell 802 may send UL-PRS measurements to the UE 600 for UE-based positioning. As another example, UE 600 may send DL-RS measurements, and the serving cell 801 and the companion cell 802 may send UL-PRS measurements, to the server 700 for UE-assisted positioning.

At stages 1290, 1292, the server 700 and/or the UE 600 may determine position information from measured signal(s) and/or position information received at stage 1280, similar to the discussion of stages 890, 892.

Figure 13:
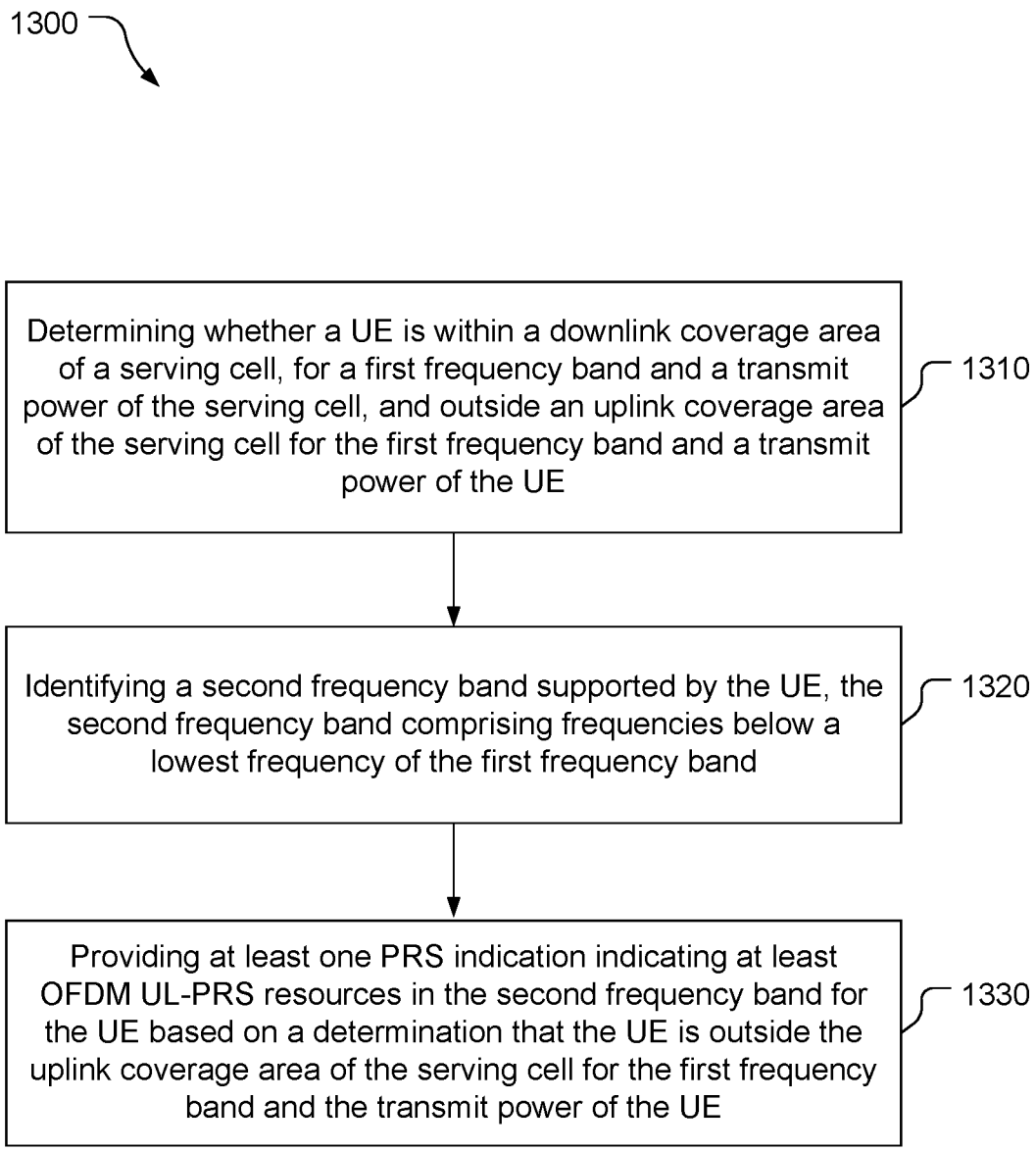
FIG. 13 is a block flow diagram of a method of indicating resources for uplink-based positioning.

Referring to FIG. 13, with further reference to FIGS. 1-12, a method 1300 of indicating resources for uplink-based positioning includes the stages shown. The method 1300 is, however, an example only and not limiting. The method 1300 may be altered, e.g., by having stages added, removed, rearranged, combined, performed concurrently, and/or having single stages split into multiple stages.

At stage 1310, the method 1300 includes determining whether a UE is within a downlink coverage area of the serving cell, for a first frequency band and a transmit power of the serving cell, and outside an uplink coverage area of the serving cell for the first frequency band and a transmit power of the UE. For example, the server 700 may receive the metrics message 814 from the serving cell 801 with an indication of a transmit power of the UE 600, an indication of a path loss between the UE 600 and the serving cell 801, and/or an indication of whether the UE 600 is in a coverage-limited area. The processor 710, possibly in combination with the memory 730, and the interface 720 (e.g., the wireless receiver 444 and the antenna 446 and/or the wired receiver 454) may comprise means for receiving the one or more inputs from the TRP. The processor 710 may use the transmit power of the UE 600 and the path loss between the UE 600 and the serving cell 801 to determine whether the UE 600 is in a coverage-limited area, e.g., the coverage-limited area 580 (outside the UL coverage area 530, which may include the marginal coverage-limited area 550). As another example, the processor 710 may determine whether the UE 600 is in the coverage-limited area by reading an indication from the serving cell 801 of whether the UE 600 is in the coverage-limited area. As another example, the processor may determine whether the UE 600 is in the coverage-limited area based on a location estimate of the UE 600 (e.g., using E-CID) and an available transmit power of the UE relative to one or more thresholds. The processor 710, possibly in combination with the memory 730 and possibly in combination with the interface 720 (e.g., the transceiver 415 such as the wired receiver 454 and/or the wireless receiver 444 and the antenna 446), may comprise means for determining whether the UE is within the downlink coverage area and outside the uplink coverage area.

At stage 1320, the method 1300 includes identifying a second frequency band supported by the UE, the second frequency band comprising frequencies below a lowest frequency of the first frequency band. For example, the processor 710 may identify an SUL band indicated by an SUL band capability message, such as the SUL band capability message 900 or the SUL band capability message 1000, to identify an SUL band supported by the UE 600 in conjunction with the communication band used by the UE 600 and the serving cell 801. The processor 710 may locate the communication band used by the UE 600 and the serving cell 801 (the first frequency band), determine an SUL band indicated in a band combination that includes the communication band, and identify this SUL band as the second frequency band. The processor 710, possibly in combination with the memory 730, may comprise means for identifying the second frequency band.

At stage 1340, the method 1300 includes providing at least one PRS indication indicating at least OFDM UL-PRS resources in the second frequency band for the UE based on a determination that the UE is outside the uplink coverage area of the serving cell for the first frequency band and the transmit power of the UE. The processor 710, e.g., the positioning signal unit 750, may transmit PSC message 856, 1156, 1256 indicating (e.g., including or acknowledging a configuration of) OFDM UL-PRS resources in the SUL band. This may enable the UE 600 to use the SUL band for conveying UL-PRS, which may enable UL-based positioning techniques with the UE 600 in NR UHB mid- and far-cell conditions that would previously not be possible. The processor 710, possibly in combination with the memory 730, in combination with the transceiver 750 (e.g., the wireless transmitter 442 and the antenna 446, and/or the wired transmitter 452) may comprise means for providing the at least one PRS indication indicating OFDM UL-PRS resources in the second frequency band.

Implementations of the method 1300 may include one or more of the following features. In an example implementation, providing the at least one PRS indication comprises providing the at least one PRS indication indicating the OFDM UL-PRS resources and OFDM DL-RS resources based on the determination that the UE is outside the uplink coverage area of the serving cell for the first frequency band and the transmit power of the UE, and based on a single-measurement round-trip time positioning technique being designated for determining position of the UE. For example, as discussed with respect to FIGS. 11 and 12, the server 700 (e.g., the positioning signal unit 750) may transmit the PSC message 1152, 1252 to indicate DL-RS resources (in either the SUL band or the communication band) based on (e.g., in view of) the UE 600 being coverage limited and a single-measurement RTT positioning technique to be used (e.g., requested and/or selected for use) to determine the position of the UE 600. In another example implementation: the uplink coverage area is a first uplink coverage area; the transmit power of the UE is a first transmit power of the UE; and providing the at least one PRS indication comprises providing the at least one PRS indication indicating both the OFDM UL-PRS resources in the second frequency band and the OFDM DL-RS resources in the first frequency band based on the UE being in a second uplink coverage area of a companion cell for the UE, for the second frequency band and a second transmit power of the UE, and the serving cell being in sync with the companion cell. For example, as discussed with respect to FIG. 11, the server 700 may transmit the PSC message 1156 to indicate UL-PRS resources in the SUL band and transmit the PSC message 1152 to indicate DL-RS resources in the communication band based on (e.g., in view of) the companion cell 802 that is within range, using the SUL band, of the UE 600 being synced with the serving cell 801. The first and second transmit powers of the UE may be the same. In another example implementation, providing the at least one PRS indication comprises providing the at least one PRS indication indicating the OFDM UL-PRS resources in the second frequency band and the OFDM DL-RS resources in the second frequency band. In another example implementation: the uplink coverage area is a first uplink coverage area; and providing the at least one PRS indication comprises providing the at least one PRS indication indicating both the OFDM UL-PRS resources and the OFDM DL-RS resources in the second frequency band based on the UE being in a second uplink coverage area of a companion cell for the UE, for the second frequency band and a second transmit power of the UE, and the serving cell being out of sync with the companion cell. For example, as discussed with respect to FIG. 8, the server 700 may transmit the PSC messages 856, 852 to indicate UL-PRS resources and the DL-RS resources in the SUL band based on the companion cell 802 that is within range, using the SUL band, of the UE 600 not being synced with the serving cell 801. The first and second transmit powers of the UE may be the same. In another example implementation, the OFDM DL-RS resources correspond to one of a DL-PRS or an SSB signal.

Also or alternatively, implementations of the method 1300 may include one or more of the following features. In an example implementation: the uplink coverage area is a first uplink coverage area; the transmit power of the UE is a first transmit power of the UE; the OFDM UL-PRS resources are first OFDM UL-PRS resources; and providing the at least one PRS indication comprises providing the at least one PRS indication indicating, based on the UE being in the first uplink coverage area or in a marginal coverage-limited area of the serving cell, based on the UE being in a second uplink coverage area of a companion cell, for the second frequency band and a second transmit power of the UE, and based on a multi-measurement round-trip time positioning technique being designated for determining position of the UE: (1) the first OFDM UL-PRS resources in the first frequency band, and first OFDM DL-RS resources in the first frequency band; and (2) second OFDM UL-PRS resources in the second frequency band, and second OFDM DL-RS resources in the second frequency band. The positioning signal unit 750, for example, may indicate downlink and uplink reference signal resources on both the SUL band and the communication band to facilitate multi-cell RTT. The first and second transmit powers of the UE may be the same. In another example implementation, determining whether the UE is within the downlink coverage area of the serving cell and outside the uplink coverage area of the serving cell comprises determining that the UE is outside the uplink coverage area of the serving cell based on a path loss between the serving cell and the UE exceeding the transmit power of the UE. For example, the server 700 may determine that the UE 600 is coverage limited if the available transmit power of the UE 600 is less than a path loss between the serving cell 801 and the UE 600.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:
1. A user equipment comprising:
   a transceiver;
   a memory; and
   a processor communicatively coupled to the transceiver and the memory and configured to:
      transmit, via the transceiver using a first frequency band, a metric message indicative of the user equipment being in a coverage-limited area corresponding to a serving cell;
      receive, via the transceiver, a positioning signal configuration message in the first frequency band, the positioning signal configuration message indicating a first configuration of a downlink reference signal and a second configuration of an uplink reference signal;
      receive, via the transceiver using the first frequency band, the downlink reference signal; and
      transmit, via the transceiver using a second frequency band, the uplink reference signal, the second frequency band comprising frequencies below a lowest frequency of the first frequency band.
2. The user equipment of claim 1, wherein the processor is configured to transmit the uplink reference signal based on receiving, via the transceiver, a switch message indicating to switch from transmitting using the first frequency band to transmitting using the second frequency band.
3. The user equipment of claim 1, wherein the processor is configured to transmit, via the transceiver using the first frequency band, a supplemental uplink band capability message indicating a capability of the user equipment to transmit the uplink reference signal using the second frequency band.
4. The user equipment of claim 1, wherein the downlink reference signal is a downlink positioning reference signal or a synchronization signal block signal.
5. The user equipment of claim 1, wherein the uplink reference signal is an uplink positioning reference signal.
6. The user equipment of claim 1, wherein the processor is further configured to:
   measure the downlink reference signal; and
   transmit an indication of a measurement of the downlink reference signal via the transceiver using the first frequency band.
7. The user equipment of claim 1, wherein the metric message indicates a transmit power of the user equipment to transmit the uplink reference signal, or indicates a path loss between the user equipment and the serving cell, or indicates a combination thereof.
8. A reference signal transfer method for user equipment positioning, the method comprising:
   transmitting, from a user equipment using a first frequency band, a metric message indicative of the user equipment being in a coverage-limited area corresponding to a serving cell;
   receiving, at the user equipment, a positioning signal configuration message in the first frequency band, the positioning signal configuration message indicating a first configuration of a downlink reference signal and a second configuration of an uplink reference signal;
   receiving, at the user equipment using the first frequency band, the downlink reference signal; and
   transmitting, from the user equipment using a second frequency band, the uplink reference signal, the second frequency band comprising frequencies below a lowest frequency of the first frequency band.
9. The method of claim 8, wherein the uplink reference signal is transmitted based on receiving, at the user equipment, a switch message indicating to switch from transmitting using the first frequency band to transmitting using the second frequency band.
10. The method of claim 8, further comprising transmitting, from the user equipment using the first frequency band, a supplemental uplink band capability message indicating a capability of the user equipment to transmit the uplink reference signal using the second frequency band.
11. The method of claim 8, wherein the downlink reference signal is a downlink positioning reference signal or a synchronization signal block signal.
12. The method of claim 8, wherein the uplink reference signal is an uplink positioning reference signal.
13. The method of claim 8, further comprising:
   measuring the downlink reference signal at the user equipment; and
   transmitting, from the user equipment, an indication of a measurement of the downlink reference signal using the first frequency band.
14. The method of claim 8, wherein the metric message indicates a transmit power of the user equipment to transmit the uplink reference signal, or indicates a path loss between the user equipment and the serving cell, or indicates a combination thereof.
15. The method of claim 8, wherein the downlink reference signal is received by the user equipment from a companion cell, distinct from the serving cell, and the uplink reference signal is transmitted from the user equipment to the companion cell.
16. The method of claim 8, wherein the downlink reference signal is received by the user equipment from the serving cell and the uplink reference signal is transmitted from the user equipment to a companion cell that is distinct from the serving cell.
17. The method of claim 8, wherein:
   the downlink reference signal is a first downlink reference signal;
   the uplink reference signal is a first uplink reference signal;
   the first downlink reference signal is received by the user equipment from the serving cell and the first uplink reference signal is transmitted from the user equipment to the serving cell; and
   a second downlink reference is received by the user equipment from a companion cell that is distinct from the serving cell, and the first uplink reference signal is transmitted from the user equipment to the companion cell.
18. A user equipment comprising:
   means for transmitting, using a first frequency band, a metric message indicative of the user equipment being in a coverage-limited area corresponding to a serving cell;
   means for receiving a positioning signal configuration message in the first frequency band, the positioning signal configuration message indicating a first configuration of a downlink reference signal and a second configuration of an uplink reference signal;
   means for receiving, using the first frequency band, the downlink reference signal; and means for transmitting, using a second frequency band, the uplink reference signal, the second frequency band comprising frequencies below a lowest frequency of the first frequency band.

19. The user equipment of claim 18, wherein the means for transmitting the uplink reference signal comprise means for transmitting the uplink reference signal based on receiving, at the user equipment, a switch message indicating to switch from transmitting using the first frequency band to transmitting using the second frequency band.

20. The user equipment of claim 18, further comprising means for transmitting, using the first frequency band, a supplemental uplink band capability message indicating a capability of the user equipment to transmit the uplink reference signal using the second frequency band.

21. The user equipment of claim 18, wherein the downlink reference signal is a downlink positioning reference signal or a synchronization signal block signal.

22. The user equipment of claim 18, wherein the uplink reference signal is an uplink positioning reference signal.

23. The user equipment of claim 18, further comprising:
means for measuring the downlink reference signal; and
means for transmitting an indication of a measurement of the downlink reference signal using the first frequency band.

24. The user equipment of claim 18, wherein the metric message indicates a transmit power of the user equipment to transmit the uplink reference signal, or indicates a path loss between the user equipment and the serving cell, or indicates a combination thereof.

25. A non-transitory, processor-readable storage medium comprising processor-readable instructions to cause a processor of a user equipment to:
transmit, using a first frequency band, a metric message indicative of the user equipment being in a coverage-limited area corresponding to a serving cell;
receive a positioning signal configuration message in the first frequency band, the positioning signal configuration message indicating a first configuration of a downlink reference signal and a second configuration of an uplink reference signal;
receive, using the first frequency band, the downlink reference signal; and
transmit, using a second frequency band, the uplink reference signal, the second frequency band comprising frequencies below a lowest frequency of the first frequency band.

26. The non-transitory, processor-readable storage medium of claim 25, wherein the processor-readable instructions to cause the processor to transmit the uplink reference signal comprise processor-readable instructions to cause the processor to transmit the uplink reference signal based on receiving, at the user equipment, a switch message indicating to switch from transmitting using the first frequency band to transmitting using the second frequency band.

27. The non-transitory, processor-readable storage medium of claim 25, further comprising processor-readable instructions to cause the processor to transmit, using the first frequency band, a supplemental uplink band capability message indicating a capability of the user equipment to transmit the uplink reference signal using the second frequency band.

28. The non-transitory, processor-readable storage medium of claim 25, wherein the downlink reference signal is a downlink positioning reference signal or a synchronization signal block signal.

29. The non-transitory, processor-readable storage medium of claim 25, wherein the uplink reference signal is an uplink positioning reference signal.

30. The non-transitory, processor-readable storage medium of claim 25, further comprising processor-readable instructions to cause the processor to:
measure the downlink reference signal; and
transmit an indication of a measurement of the downlink reference signal using the first frequency band.

31. The non-transitory, processor-readable storage medium of claim 25, wherein the metric message indicates a transmit power of the user equipment to transmit the uplink reference signal, or indicates a path loss between the user equipment and the serving cell, or indicates a combination thereof.

32. A network entity comprising:
a transceiver;
a memory; and
a processor communicatively coupled to the transceiver and the memory and configured to:
receive, via the transceiver from a user equipment, a metric message indicative of the user equipment being in a coverage-limited area corresponding to the network entity, the coverage-limited area being an area in which the user equipment is able to receive and measure a downlink signal from the network entity and from which a single instance of an uplink signal transmitted by the user equipment is unable to be received and measured by the network entity;
determine, based on the metric message, that the user equipment is disposed in the coverage-limited area; and
transmit, via the transceiver to a server, a coverage message indicating that the user equipment is disposed in the coverage-limited area.

33. The network entity of claim 32, wherein the metric message indicates a transmit power of the user equipment to transmit the uplink signal, or indicates a path loss between the user equipment and the network entity, or indicates a combination thereof, and to determine that the user equipment is disposed in the coverage-limited area the processor is configured to determine that the transmit power minus the path loss is below a threshold.

34. The network entity of claim 32, wherein the metric message indicates a transmit power of the user equipment to transmit the uplink signal, or indicates a path loss between the user equipment and the network entity, or indicates a combination thereof, and to determine that the user equipment is disposed in the coverage-limited area the processor is configured to determine that the path loss exceeds the transmit power.

35. The network entity of claim 32, wherein to determine that the user equipment is disposed in the coverage-limited area the processor is configured to:
receive, via the transceiver from the user equipment, the uplink signal; and
determine that a received power of the uplink signal at the network entity is below a threshold power.

36. A method for indicating a coverage status of a user equipment, the method comprising:
receiving, at a network entity from the user equipment, a metric message indicative of the user equipment being in a coverage-limited area corresponding to the network entity, the coverage-limited area being an area in which the user equipment is able to receive and measure a downlink signal from the network entity and from which a single instance of an uplink signal transmitted by the user equipment is unable to be received and measured by the network entity;

determining, at the network entity and based on the metric message, that the user equipment is disposed in the coverage-limited area; and transmitting, from the network entity to a server, a coverage message indicating that the user equipment is disposed in the coverage-limited area.

37. The method of claim 36, wherein the metric message indicates a transmit power of the user equipment to transmit the uplink signal, or indicates a path loss between the user equipment and the network entity, or indicates a combination thereof, and determining that the user equipment is disposed in the coverage-limited area comprises determining that the transmit power minus the path loss is below a threshold.

38. The method of claim 36, wherein the metric message indicates a transmit power of the user equipment to transmit the uplink signal, or indicates a path loss between the user equipment and the network entity, or indicates a combination thereof, and determining that the user equipment is disposed in the coverage-limited area comprises determining that the path loss exceeds the transmit power.

39. The method of claim 36, wherein determining that the user equipment is disposed in the coverage-limited area comprises:

receiving, at the network entity from the user equipment, the uplink signal; and determining, at the network entity, that a received power of the uplink signal at the network entity is below a threshold power.

40. A network entity comprising:

means for receiving, from the user equipment, a metric message indicative of the user equipment being in a coverage-limited area corresponding to the network entity, the coverage-limited area being an area in which the user equipment is able to receive and measure a downlink signal from the network entity and from which a single instance of an uplink signal transmitted by the user equipment is unable to be received and measured by the network entity;

means for determining, based on the metric message, that the user equipment is disposed in the coverage-limited area; and means for transmitting, to a server, a coverage message indicating that the user equipment is disposed in the coverage-limited area.

41. The network entity of claim 40, wherein the metric message indicates a transmit power of the user equipment to transmit the uplink signal, or indicates a path loss between the user equipment and the network entity, or indicates a combination thereof, and the means for determining that the user equipment is disposed in the coverage-limited area comprise means for determining that the transmit power minus the path loss is below a threshold.

42. The network entity of claim 40, wherein the metric message indicates a transmit power of the user equipment to transmit the uplink signal, or indicates a path loss between the user equipment and the network entity, or indicates a combination thereof, and the means for determining that the user equipment is disposed in the coverage-limited area comprise means for determining that the path loss exceeds the transmit power.

43. The network entity of claim 40, wherein the means for determining that the user equipment is disposed in the coverage-limited area comprise:

means for receiving, from the user equipment, the uplink signal; and means for determining that a received power of the uplink signal at the network entity is below a threshold power.

44. A non-transitory, processor-readable storage medium comprising processor-readable instructions to cause a processor of a network entity to:

receive, from the user equipment, a metric message indicative of the user equipment being in a coverage-limited area corresponding to the network entity, the coverage-limited area being an area in which the user equipment is able to receive and measure a downlink signal from the network entity and from which a single instance of an uplink signal transmitted by the user equipment is unable to be received and measured by the network entity;

determine, based on the metric message, that the user equipment is disposed in the coverage-limited area; and transmit, to a server, a coverage message indicating that the user equipment is disposed in the coverage-limited area.

45. The non-transitory, processor-readable storage medium of claim 44, wherein the metric message indicates a transmit power of the user equipment to transmit the uplink signal, or indicates a path loss between the user equipment and the network entity, or indicates a combination thereof, and the processor-readable instructions to cause a processor of the network entity to determine that the user equipment is disposed in the coverage-limited area comprise processor-readable instructions to cause a processor of the network entity to determining that the transmit power minus the path loss is below a threshold.

46. The non-transitory, processor-readable storage medium of claim 44, wherein the metric message indicates a transmit power of the user equipment to transmit the uplink signal, or indicates a path loss between the user equipment and the network entity, or indicates a combination thereof, and the processor-readable instructions to cause a processor of the network entity to determine that the user equipment is disposed in the coverage-limited area comprise processor-readable instructions to cause a processor of the network entity to determine that the path loss exceeds the transmit power.

47. The non-transitory, processor-readable storage medium of claim 44, wherein the processor-readable instructions to cause a processor of the network entity to determine that the user equipment is disposed in the coverage-limited area comprise processor-readable instructions to cause a processor of the network entity to:

receive, from the user equipment, the uplink signal; and determine that a received power of the uplink signal at the network entity is below a threshold power.

* * * * *